US012771416B2

(12) United States Patent
Liu et al.

(10) Patent No.: US 12,771,416 B2
(45) Date of Patent: Oct. 20, 2026

(54) UPLINK DATA SENDING METHOD, UPLINK DATA RECEIVING METHOD, AND COMMUNICATION APPARATUS

(71) Applicant: HUAWEI TECHNOLOGIES CO., LTD., Shenzhen (CN)

(72) Inventors: Rongkuan Liu, Shanghai (CN); Hua Xu, Ottawa (CA); Peng Zhang, Reading (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 390 days.

(21) Appl. No.: 18/518,571

(22) Filed: Nov. 23, 2023

(65) Prior Publication Data

US 2024/0097755 A1 Mar. 21, 2024

Related U.S. Application Data

(63) Continuation of application No. PCT/CN2022/093333, filed on May 17, 2022.

(30) Foreign Application Priority Data

Jun. 11, 2021 (CN) ......................... 202110653215.3

(51) Int. Cl.
*H04B 7/0456* (2017.01)

(52) U.S. Cl.
CPC ........... *H04B 7/0481* (2023.05); *H04B 7/046* (2013.01); *H04B 7/0482* (2013.01)

(58) Field of Classification Search
CPC .... H04B 7/0481; H04B 7/046; H04B 7/0482; H04B 7/0628; H04B 7/0456; H04W 72/044
See application file for complete search history.

(56) References Cited

U.S. PATENT DOCUMENTS

| | | | | |
|---|---|---|---|---|
| 2015/0264700 | A1* | 9/2015 | Li | H04L 1/1887 370/329 |
| 2017/0093473 | A1* | 3/2017 | Pham | H04B 7/0626 |
| 2020/0204329 | A1* | 6/2020 | Fujishiro | H04L 1/1861 |
| 2020/0336178 | A1 | 10/2020 | Ma et al. | |
| 2021/0050889 | A1* | 2/2021 | Park | H04B 7/0404 |
| 2021/0135717 | A1 | 5/2021 | Huang et al. | |
| 2021/0135812 | A1* | 5/2021 | Sridharan | H04L 5/0048 |
| 2021/0211169 | A1* | 7/2021 | Xue | H04W 16/28 |
| 2022/0239351 | A1* | 7/2022 | Huang | H04L 5/0094 |

FOREIGN PATENT DOCUMENTS

CN 109802711 A 5/2019

* cited by examiner

*Primary Examiner* — Edan A Orgad
*Assistant Examiner* — Malick A Sohrab

(57) ABSTRACT

This application discloses an uplink data sending method, an uplink data receiving method, and a communication apparatus. The sending method includes: A first terminal device sends first indication information to a network device, where the first indication information is used to determine a first precoding codebook subset to be used by a virtual terminal device. In this way, the network device sends configuration information to the first terminal device based on the first precoding codebook subset to be used by the virtual terminal device, so that the first terminal device sends data to the network device based on the first precoding codebook subset.

14 Claims, 10 Drawing Sheets

UPLINK DATA SENDING METHOD, UPLINK DATA RECEIVING METHOD, AND COMMUNICATION APPARATUS

CROSS-REFERENCE TO RELATED APPLICATIONS

This application is a continuation of International Application No. PCT/CN2022/093333, filed on May 17, 2022, which claims priority to Chinese Patent Application No. 202110653215.3, filed on Jun. 11, 2021. The disclosures of the aforementioned applications are hereby incorporated by reference in their entireties.

TECHNICAL FIELD

This application relates to the field of communication technologies, and in particular, to an uplink data sending method, an uplink data receiving method, and a communication apparatus.

BACKGROUND

A terminal device sends data to a network device on an allocated resource by using an antenna. Different services have different requirements for a capability of the terminal device. For example, a service that does not require a high data transmission rate or does not have a large amount of data has a low requirement for the capability of the terminal device. Relatively, a service that requires a high data transmission rate or has a large amount of data has a higher requirement for the capability of the terminal device. For example, a terminal device that has higher transmit power and a larger quantity of antennas is required for implementation. However, because a quantity of antennas or maximum transmit power of some terminal devices is limited, an uplink transmission capacity of the terminal devices is limited. Therefore, an actual transmission requirement of the service cannot be met.

SUMMARY

This application provides an uplink data sending method, an uplink data receiving method, and a communication apparatus, to increase a transmission rate of uplink data sent by a terminal device.

According to a first aspect, an uplink data sending method is provided. The method may be performed by a first communication apparatus. The first communication apparatus may be a communication device or a communication apparatus that can support a communication device in implementing a function required in the method, for example, a chip system. The following is described by using an example in which the communication device is a first terminal device. The method includes: The first terminal device sends first indication information to a network device, and receives configuration information from the network device. The first indication information is used to determine a first precoding codebook subset to be used by a virtual terminal device, and the configuration information indicates the first precoding codebook subset, so that the first terminal device sends data to the network device based on the first precoding codebook subset. Antennas of the virtual terminal device include an antenna of the first terminal device and antennas of one or more second terminal devices.

In this embodiment of this application, after aggregating antenna capabilities of the one or more second terminal devices, the first terminal device may be considered as the virtual terminal device. In other words, the antenna (antenna capability) of the virtual terminal device includes the antenna (antenna capability) of the first terminal device and the antenna (antenna capability) of at least one second terminal device. Because the first terminal device aggregates an antenna capability of another terminal device, the first terminal device has a larger antenna capability. The first terminal device sends the data to the network device by using the larger antenna capability. This can clearly increase a transmission rate of data sent by the first terminal device, compared with a case in which the first terminal device sends the data by using the antenna capability of the first terminal device.

Optionally, the antennas of the virtual terminal device include the antenna of the first terminal device and the antenna of the at least one second terminal device. It may be understood that a quantity of antenna ports of the virtual terminal device is equal to a quantity of antenna ports of the first terminal device and a quantity of antenna ports of the at least one second terminal device. It should be understood that a quantity of antenna ports corresponding to the first precoding codebook subset is equal to the quantity of antenna ports of the virtual terminal device.

In a possible implementation, the first indication information may indicate an antenna coherence capability of the virtual terminal device. The antenna coherence capability includes fully coherent, partial coherent, or non-coherent. Because a terminal device may determine whether an antenna of the terminal device and an antenna of another terminal device may be phase-synchronous, the terminal device may determine the antenna coherence capability of the virtual terminal device. In this solution, the antenna coherence capability of the virtual terminal device may be determined by the terminal device and notified to the network device. Therefore, the network device determines, based on the antenna coherence capability of the virtual terminal device, the first precoding codebook subset, that is, a precoding codebook subset used by the first terminal device to send the data. The first precoding codebook subset is determined based on the antenna coherence capability of the virtual terminal device. Therefore, when the first terminal device sends the data by using the first precoding codebook subset, transmission efficiency of the first terminal device can be improved.

In an alternative solution, the first indication information may indicate a candidate set of the first precoding codebook subset. It should be understood that an antenna coherence capability of a terminal device may be used to determine a precoding codebook subset that can be used by the terminal device. In this solution, the first terminal device may determine, based on an antenna coherence capability of the virtual terminal device, a precoding codebook subset that can be used by the virtual terminal device, for example, the candidate set of the first precoding codebook subset. Any terminal device reports an antenna coherence capability of the terminal device to the network device when accessing a network. Therefore, in this solution, an existing mechanism in which a terminal device reports an antenna coherence capability of the terminal device may be reused without increasing more signaling overheads. Alternatively, the first terminal device may determine the candidate set of the first precoding codebook subset based on a precoding codebook subset that can be used by the first terminal device and a precoding codebook subset that can be used by the at least one second terminal device. Compared with the candidate set determined based on the antenna coherence capability of the virtual terminal device, because the candidate set of the first precoding codebook subset is determined from precoding codebook subsets that can be used by the first terminal device and the second terminal device, a codeword included in the candidate set is more accurate, and is more suitable for the first terminal device to send the data.

In a possible implementation, the method further includes: The first terminal device receives second indication information from the network device. The second indication information indicates a correspondence between the first terminal device and the at least one second terminal device. The one or more second terminal devices belong to the at least one second terminal device. In this solution, the network device may notify the first terminal device of at least one second terminal device that can assist the first terminal device in sending uplink data. Therefore, the first terminal device may select some or all of the at least one second terminal device for aggregation, and send the uplink data to the network device by using an aggregated antenna capability. The first terminal device does not need to determine a terminal device that can assist the first terminal device, to minimize energy consumption of the first terminal device.

In a possible implementation, the first terminal device determines that a preset condition is met, and sends the first indication information to the network device. The preset condition includes one or more of the following conditions: The first terminal device receives the second indication information; or a data rate of the uplink data is greater than or equal to a first preset threshold; or a quantity of antennas of the first terminal device is less than or equal to a second preset threshold. The first terminal device may perform a plurality of services. Some services require that the first terminal device has a strong antenna capability. Some services do not require that the first terminal device has the strong antenna capability. In addition, the antenna coherence capability indicated by the first indication information or the candidate set of the first precoding codebook subset is different for different services. Therefore, in this solution, the first terminal device may determine, based on an actual requirement, whether to send the first indication information to the network device, that is, dynamically report the first indication information. This can better meet the actual requirement. For example, if the quantity of antennas of the first terminal device is small, it may be considered that the first terminal device may aggregate an antenna capability of another terminal device due to a limited quantity of antennas, to obtain a high transmission rate, that is, the first terminal device may report the first indication information to the network device. For another example, if a data rate of uplink data to be sent by the first terminal device is high, the first terminal device may also aggregate an antenna capability of another terminal device, that is, the first terminal device may also report the first indication information to the network device. For another example, if the network device sends the second indication information to the first terminal device, it may be considered that the first terminal device needs to aggregate an antenna capability of another terminal device. In this case, the first terminal device also reports the first indication information to the network device.

In a possible implementation, the method further includes: The first terminal device receives third indication information from each of the one or more second terminal devices. The third indication information indicates an antenna coherence capability of the corresponding second terminal device. The first terminal device determines the antenna coherence capability of the virtual terminal device based on an antenna coherence capability of the first terminal device and the antenna coherence capability of the second terminal device. Because the first terminal device does not know the antenna coherence capability of each second terminal device, if the first terminal device considers the antenna coherence capability of the second terminal by default, it is clearly that accuracy cannot be ensured. Therefore, the second terminal device may notify the first terminal device of the antenna coherence capability of the second terminal device. In this way, the antenna coherence capability of the virtual terminal device that is determined by the first terminal device based on the antenna coherence capability of the first terminal device and the learned antenna coherence capability of the second terminal device is more accurate.

In a possible implementation, the method further includes: The first terminal device sends the first indication information to the one or more second terminal devices. The first terminal device sends the data to the network device by using the antenna capability of the second terminal device. It may be considered that the data sent by the first terminal device to the network device may be split into two parts. One part is sent by the first terminal device to the network device, and the other part may be forwarded by the second terminal device to the network device. However, the second terminal device does not know the antenna coherence capability of the virtual terminal device or the first precoding codebook subset. Consequently, an antenna port mapped to the second terminal device may not match a precoding codeword of the virtual terminal device, and normal data forwarding cannot be ensured. Therefore, in this solution, the first terminal device sends the first indication information to the second terminal device, to ensure that the antenna port mapped to the second terminal device matches the precoding codeword of the virtual terminal device.

According to a second aspect, an uplink data receiving method is provided. The method may be performed by a second communication apparatus. The second communication apparatus may be a communication device or a communication apparatus that can support a communication device in implementing a function required in the method, for example, a chip system. The following is described by using an example in which the communication device is a network device. The method includes:

The network device determines a first precoding codebook subset to be used by a virtual terminal device, sends first indication information to a first terminal device, and receives uplink data from the first terminal device. Antennas of the virtual terminal device include an antenna of the first terminal device and antennas of one or more second terminal devices. The first indication information indicates the first precoding codebook subset. The uplink data is sent based on the first precoding codebook subset.

In a possible implementation, the first indication information indicates an antenna coherence capability of the virtual terminal device. The antenna coherence capability includes fully coherent, partial coherent, or non-coherent. Alternatively, the first indication information indicates a candidate set of the first precoding codebook subset.

In a possible implementation, a quantity of antenna ports corresponding to the first precoding codebook subset is equal to a quantity of antenna ports of the virtual terminal device.

In a possible implementation, the method further includes: The network device sends second indication information to the first terminal device. The second indication information indicates a correspondence between the first terminal device and at least one second terminal device. The one or more second terminal devices belong to the at least one second terminal device.

In a possible implementation, the network device determines the first precoding codebook subset to be used by the virtual terminal device in a plurality of determining manners. A determining manner used by the network device to determine the first precoding codebook subset is not limited in this embodiment of this application.

For example, the network device receives third indication information from the first terminal device. The third indication information indicates the first precoding codebook subset. In this solution, the first terminal device notifies the network device of the first precoding codebook subset. The network device does not need to determine the first precoding codebook subset by itself.

For example, the network device receives fourth indication information from the first terminal device, and receives fifth indication information from each of the one or more second terminal devices. The fourth indication information indicates a first candidate set of the first precoding codebook subset. The fifth indication information indicates a second candidate set that corresponds to the second terminal device and that is of the first precoding codebook subset. Therefore, the network device determines the first precoding codebook subset based on the first candidate set and the second candidate set. In this solution, the network device determines the first precoding codebook subset by itself based on the first candidate set reported by the first terminal device and the second candidate set reported by each of the at least one second terminal device. The first terminal device does not need to additionally notify the first precoding codebook subset. This can reduce signaling interaction.

For example, the network device determines the antenna coherence capability of the virtual terminal device, and determines the first precoding codebook subset based on the antenna coherence capability of the virtual terminal device. The antenna coherence capability includes fully coherent, partial coherent, or non-coherent. In this solution, the network device determines the first precoding codebook subset based on the antenna coherence capability of the virtual terminal device, that is, determines the first precoding codebook subset by itself. The first terminal device does not need to additionally notify the first precoding codebook subset. This can reduce signaling interaction.

In a possible implementation, the determining the antenna coherence capability of the virtual terminal device includes:

receiving sixth indication information from the first terminal device, where the sixth indication information indicates the antenna coherence capability of the virtual terminal device. The first terminal device may report the antenna coherence capability of the virtual terminal device to the network device. The network device does not need to determine the antenna coherence capability by itself.

In a possible implementation, the determining the antenna coherence capability of the virtual terminal device includes:

receiving seventh indication information from the first terminal device and eighth indication information of each of the one or more second terminal devices. The seventh indication information indicates an antenna coherence capability of the first terminal device. The eighth indication information indicates an antenna coherence capability of the corresponding second terminal device. The antenna coherence capability of the virtual terminal device is determined based on the antenna coherence capability of the first terminal device and the antenna coherence capabilities of the one or more second terminal devices. In this solution, the first terminal device does not need to additionally notify the antenna coherence capability of the virtual terminal device. This can reduce signaling interaction.

In a possible implementation, the antenna of the first terminal device is not coherent with the antennas of the one or more second terminal devices. Because the network device does not know whether the antenna of the first terminal device is coherent with an antenna of any second terminal device, it may be considered by default that the antenna of the first terminal device is not coherent with the antennas of the one or more second terminal devices. This is simple.

According to a third aspect, a communication apparatus is provided. The communication apparatus has a function of implementing behavior in the method example in the first aspect. For beneficial effects, refer to the descriptions in the first aspect. Details are not described herein again. The function may be implemented by hardware, or may be implemented by hardware executing corresponding software. The hardware or the software includes one or more modules corresponding to the foregoing function. In a possible design, the communication apparatus includes a processing module and/or a transceiver module. These modules may perform corresponding functions in the method example in the first aspect. For details, refer to the detailed descriptions in the method example. Details are not described herein again.

According to a fourth aspect, a communication apparatus is provided. The communication apparatus has a function of implementing behavior in the method example in the second aspect. For beneficial effects, refer to the descriptions in the second aspect. Details are not described herein again. The function may be implemented by hardware, or may be implemented by hardware executing corresponding software. The hardware or the software includes one or more modules corresponding to the foregoing function. In a possible design, the communication apparatus includes a processing module and/or a transceiver module. These modules may perform corresponding functions in the method example in the second aspect. For details, refer to the detailed descriptions in the method example. Details are not described herein again.

According to a fifth aspect, an embodiment of this application provides a communication apparatus. The communication apparatus may be the communication apparatus in the first aspect or the second aspect in the foregoing embodiments, or a chip or a chip system disposed in the communication apparatus in the first aspect or the second aspect. The communication apparatus includes a communication interface and a processor, and optionally, further includes a memory. The memory is configured to store a computer program, instructions, or data. The processor is coupled to the memory and the communication interface. When the processor reads the computer program, the instructions, or the data, the communication apparatus is enabled to perform the method performed by the terminal device or the network device in the foregoing method embodiments.

According to a sixth aspect, an embodiment of this application provides a chip system. The chip system includes a processor and may further include a memory and/or a communication interface, and is configured to implement the method in the first aspect or the second aspect. In a possible implementation, the chip system further includes the memory, configured to store program instructions and/or data. The chip system may include a chip, or may include a chip and another discrete component.

According to a seventh aspect, an embodiment of this application provides a communication system. The communication system includes the communication apparatus in the third aspect and the communication apparatus in the fourth aspect.

According to an eighth aspect, this application provides a computer-readable storage medium. The computer-readable storage medium stores a computer program. When the computer program is run, the method in the first aspect or the second aspect is implemented.

According to a ninth aspect, a computer program product is provided. The computer program product includes computer program code. When the computer program code is run, the method in the first aspect or the second aspect is performed.

For beneficial effects of the fifth aspect to the ninth aspect and the implementations thereof, refer to the descriptions of the beneficial effects of the aspects or the aspects and the implementations thereof.

DESCRIPTION OF EMBODIMENTS

To make objectives, technical solutions, and advantages of embodiments of this application clearer, the following further describes embodiments of this application in detail with reference to the accompanying drawings.

The technical solutions provided in embodiments of this application may be applied to the fifth generation (the fifth generation, 5G) mobile communication system, for example, a new radio (new radio, NR) system, or may be applied to a long term evolution (long term evolution, LTE) system, or may be applied to an evolution-advanced system based on LTE or NR, a future wireless communication system, another similar communication system, or the like. This is not specifically limited.

Figure 1:
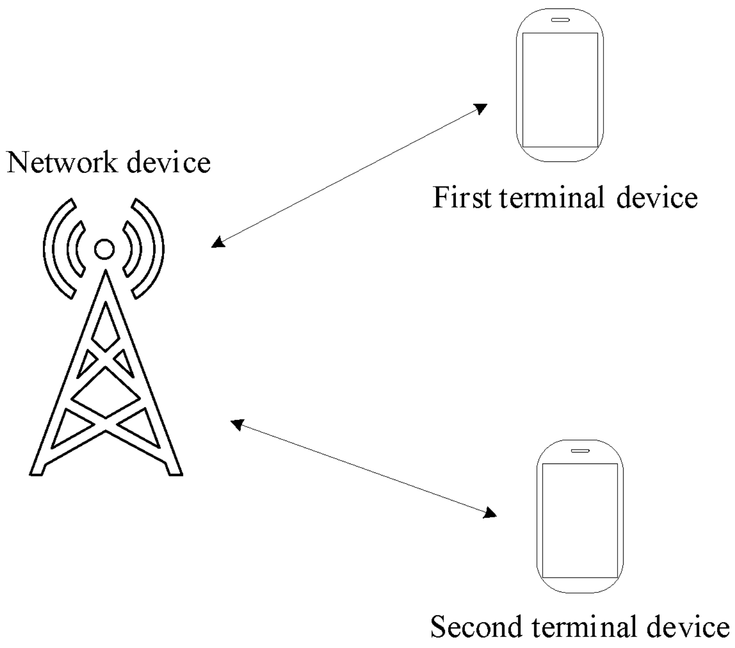
FIG. 1 is a schematic diagram of a network architecture to which an embodiment of this application is applicable.

FIG. 1 is a schematic diagram of an example of an architecture of a communication system to which an embodiment of this application is applicable. The communication system may include a network device and at least one terminal device. As shown in FIG. 1, an example in which at least one terminal device is two terminal devices is used. The terminal device is connected to the network device in a wireless manner. It should be noted that FIG. 1 is only an example. Quantities of network devices and terminal devices included in the mobile communication system are not limited in this embodiment of this application. In some embodiments, the communication system may further include another network device, for example, a wireless relay device or a wireless backhaul device. In this scenario, the network device may communicate with the terminal device through the relay device.

The network device is an access device through which the terminal device accesses the mobile communication system in the wireless manner. For example, the network device includes an access network (access network, AN) device such as a base station (for example, an access point). The network device may alternatively be a device that communicates with a terminal over an air interface, for example, another possible terminal apparatus. The network device may include an evolved NodeB (NodeB, eNB, or e-NodeB, evolved Node B) in a long term evolution (long term evolution, LTE) system or a long term evolution-advanced (long term evolution-advanced, LTE-A) system, or may include a next generation NodeB (next generation NodeB, gNB) in a 5G NR system, or may include an access node in a wireless-fidelity (wireless-fidelity, Wi-Fi) system. The network device may alternatively be a relay station, a balloon station, a vehicle-mounted device, a future evolved public land mobile network (Public Land Mobile Network, PLMN) device, a device in a device-to-device (device-to-device, D2D) network, a device in a machine-to-machine (machine-to-machine, M2M) network, a device in an internet of things (internet of things, IoT) network, a network device in another PLMN network, and the like. In this embodiment of this application, the base station may include one or more co-site or non-co-site transmission reception points (transmission receiving points/transmission reception points, TRPs). In addition, a specific technology and a specific device form that are used by the network device are not limited in this embodiment of this application.

For example, the network device in FIG. 1 may be a base station, and correspond to different devices in different systems. For example, the network device in FIG. 1 may correspond to an eNB in the fourth generation mobile communication technology (the fourth generation, 4G) system, and corresponds to a gNB in a 5G system. In this embodiment of this application, the network device may include a central unit (central unit, CU) and a distributed unit (distributed unit, DU). A plurality of DUs may be centrally controlled by one CU. The CU and the DU may be divided based on a function of a protocol layer of a wireless network that the CU and the DU have. For example, functions of a packet data convergence protocol (packet data convergence protocol, PDCP) layer and a protocol layer above the packet data convergence protocol layer are configured in the CU, and functions of protocol layers below the PDCP layer, for example, a radio link control (radio link control, RLC) layer and a medium access control (medium access control, MAC) layer, are configured in the DU. It should be noted that the protocol layer division is only an example, and there may be division of another protocol layer. A radio frequency apparatus may be disposed remotely and not be disposed in the DU, or may be integrated into the DU, or one part is disposed remotely, and the other part is integrated into the DU. This is not limited in this embodiment of this application. In addition, in some embodiments, a control plane (control plane, CP) and a user plane (user plane, UP) of the CU may be separated and implemented by different entities: a control plane CU entity (CU-CP entity) and a user plane CU entity (CU-UP entity). In the network architecture, signaling generated by the CU may be sent to UE through the DU, or signaling generated by the UE may be sent to the CU through the DU. The DU may directly encapsulate the signaling at the protocol layer without parsing the signaling, to transparently transmit the signaling to the UE or the CU. In the network architecture, the CU is divided as a network device on a RAN side. In addition, the CU may be divided as a network device on a CN side. This is not limited in this application.

The terminal device may be briefly referred to as a terminal, or referred to as user equipment (user equipment, UE). The terminal device is a device having a wireless transceiver function, and may send a signal to the network device, or receive a signal from the network device. For example, the terminal device may be a mobile phone (mobile phone), a tablet computer (Pad), a computer having a wireless transceiver function, a virtual reality (virtual reality, VR) terminal device, an augmented reality (augmented reality, AR) terminal device, a wireless terminal device in industrial control (industrial control), a wireless terminal device in self-driving (self-driving), a wireless terminal device in telemedicine (telemedicine), a wireless terminal device in a smart grid (smart grid), a wireless terminal device in transportation safety (transportation safety), a wireless terminal device in a smart city (smart city), a wireless terminal device in a smart home (smart home), a smart speaker in the IoT network, or the like. The terminal device may be fixed or mobile. This is not limited in this embodiment of this application. In some embodiments, the terminal device may also be referred to as a mobile station, a mobile console, a remote station, a remote terminal device, a mobile device, a terminal device agent, a terminal apparatus, or the like.

By way of example, and not limitation, in this embodiment of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. If the various terminal devices described above are located in a vehicle (for example, placed in the vehicle or installed in the vehicle), the terminal devices may be all considered as vehicle-mounted terminal devices. For example, the vehicle-mounted terminal device is also referred to as an on-board unit (on-board unit, OBU). In addition, in this embodiment of this application, the terminal device may be an apparatus configured to implement a function of a terminal, or may be an apparatus that can support the terminal device in implementing the function, for example, a chip system. The apparatus may be installed in the terminal device. For example, the terminal device may alternatively be a vehicle detector or a sensor in a gas station.

Figure 2:
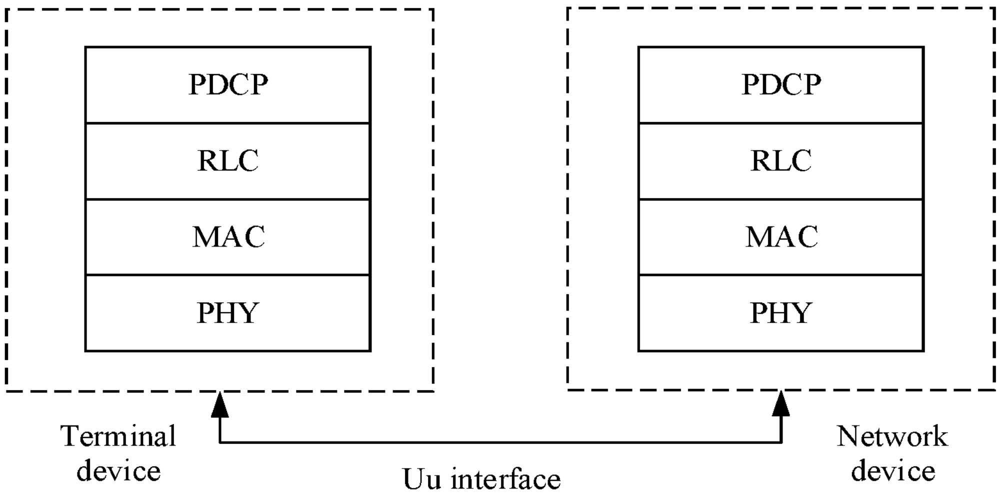
FIG. 2 is a schematic diagram of a protocol stack of a terminal device and a protocol stack of a network device.

The terminal device may perform communication through a communication interface between the terminal device and the network device, for example, a Uu interface (Uu interface). For example, FIG. 2 is a schematic diagram of a protocol stack of a terminal device and a protocol stack of a network device. To be specific, the terminal device and the network device each have a set of protocol stacks for signaling and/or data interaction between each other. As shown in FIG. 2, the protocol stack of the terminal device includes a PDCP layer, an RLC layer, a MAC layer, and a physical (physical, PHY) layer. Similarly, the protocol stack of the network device also includes a PDCP layer, an RLC layer, a MAC layer, and a PHY layer. The PDCP layer mainly processes an RRC message from a control plane and an internet protocol (internet protocol, IP) packet from a data plane. For example, processing such as header compression/decompression, encryption/decryption, integrity protection, transmission of user data and control plane data, reordering and retransmission during handover, and discarding of timeout data may be performed on the RRC message from the control plane or the IP packet from the data plane. The RLC layer is mainly responsible for segmentation/serial connection and recombination of service data units (service data units, SDUs) of the RLC layer, error correction of automatic repeat request (automatic repeat request, ARQ), reordering of protocol data units (protocol data units, PDUs) of the RLC layer, repeated packet detection, and resegmentation of the RLC PDU. The MAC layer is mainly responsible for matching a logical channel and a transmission channel, hybrid automatic repeat request (hybrid automatic repeat request, HARQ) scheduling, logical channel prioritization, random access, and the like. The PHY layer is mainly responsible for coding, HARQ processing at the physical layer, modulation, multi-antenna processing, time-frequency resource mapping, and the like.

It should be understood that the terminal device sends, by using an antenna, data to the network device on an allocated resource. Different services have different requirements for a capability of the terminal device. For example, a service that does not require a high data transmission rate or does not have a large amount of data may be performed through a machine-type terminal device that has a weak capability and that is implemented at a low cost. Relatively, a service that requires a high data transmission rate or has a large amount of data needs to be implemented through a terminal device that is more complex than the machine-type terminal device, for example, a terminal device that has higher transmit power and a larger quantity of antennas. However, because a quantity of antennas or maximum transmit power of some terminal devices is limited, an uplink transmission capacity of the terminal devices is limited. Therefore, an actual transmission requirement of the service cannot be met. For example, in a possible scenario, a service requires a high data rate, but a terminal device that performs the service may be a terminal device with low complexity or a reduced capability (REDuced CAPability, REDCAP). Because the terminal device with the REDCAP has a small quantity of antennas, the terminal device with the REDCAP may not support the service.

In view of this, an embodiment of this application provides an uplink transmission method. In the method, one terminal device (for example, a first terminal device) may aggregate antenna capabilities of another one or more terminal devices (for example, a second terminal device), so that the first terminal device can use a larger antenna capability. The first terminal device sends uplink data by using the larger antenna capability. This can increase a transmission rate of the uplink data sent by the first terminal device.

The following describes the technical solutions provided in embodiments of this application. For ease of understanding, the following first describes technical terms in embodiments of this application.

(1) Source user equipment (source UE, SUE) is relative to cooperative user equipment (cooperative UE, CUE). The SUE is a terminal device that needs to send data. The CUE is a terminal device that assists the SUE in sending the data. That the CUE assists the SUE in sending the data may be understood as that the SUE may aggregate an antenna capability of the CUE, and send the data by using an antenna capability of the SUE and the antenna capability of the CUE. It should be noted that specific names of the SUE and the CUE are not limited in embodiments of this application. For example, the SUE may also be referred to as remote (remote) UE, and the CUE may also be referred to as relay UE or auxiliary UE.

(2) Virtual user equipment (virtual UE, VUE) is a terminal device formed after the SUE aggregates the antenna capability of the CUE, and may also be referred to as an aggregated terminal device. The VUE may also be considered as a new-type terminal device. For ease of understanding, the following describes the VUE with reference to the accompanying drawings.

Figure 3:
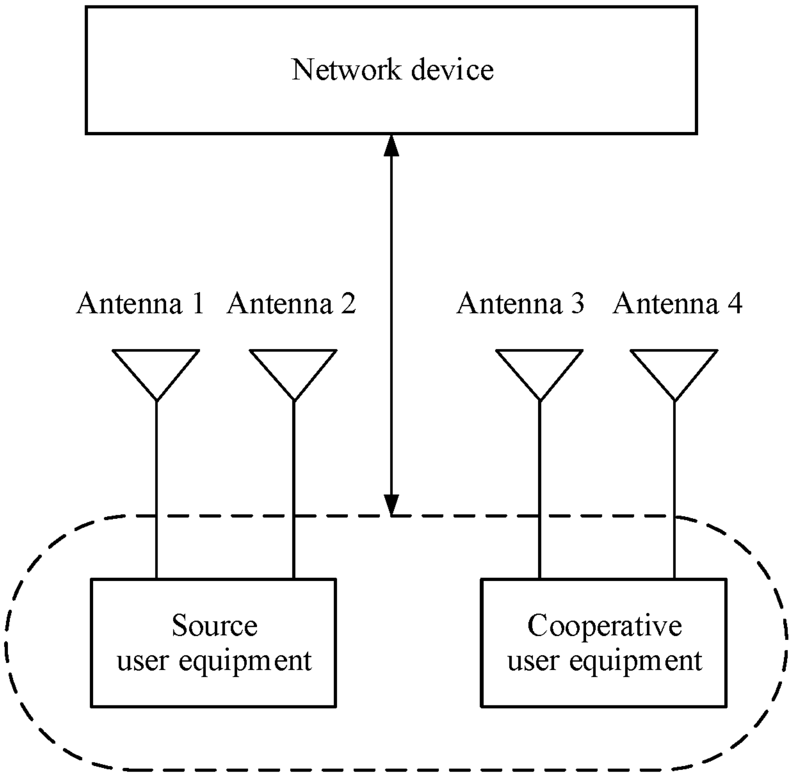
FIG. 3 is a schematic diagram of a network architecture including VUE and a network device.

FIG. 3 is a schematic diagram of a network architecture including VUE and a network device. As shown in FIG. 3, SUE has two antennas (for example, an antenna 1 and an antenna 2), and CUE has two antennas (for example, an antenna 3 and an antenna 4). In this case, VUE formed by aggregating the SUE and the CUE has four antennas. It may be understood that the antenna in this specification may be referred to as an antenna port, a port, or a radio frequency (radio frequency, RF) chain (chain). It should be understood that antennas of the VUE include an antenna of the SUE and an antenna of the CUE. It may also be considered that a quantity of antennas (a quantity of antenna ports) of the VUE is greater than a quantity of antennas of the SUE. For example, the quantity of antennas of the VUE is equal to a sum of the quantity of antennas (a quantity of antenna ports) of the SUE and a quantity of antennas (a quantity of antenna ports) of the CUE. The SUE sends data to the network device by essentially using the antenna of the VUE. Because the quantity of antennas of the VUE is greater than the quantity of antennas of the SUE, a data sending rate of the SUE can be increased.

It should be noted that a specific form of the VUE is not limited in this embodiment of this application. For example, the VUE may include one SUE and at least one CUE, and the SUE may be connected to the at least one CUE in a wired manner or in a wireless manner.

In an example, the VUE may include one SUE and at least one CUE that is connected to the SUE in the wired manner. In this case, the VUE may be considered as a terminal device (this is used as an example in FIG. 3). The SUE and the CUE may be considered as different modules of the VUE. Even if the SUE and the CUE are used as the modules of the VUE, the network device considers the SUE and the CUE of the VUE as an independent terminal device. The SUE and the CUE separately search for a cell, and request to access a network. The network device allocates different identifier information, for example, a radio network temporary identifier (radio network temporary identifier, RNTI), to the SUE and the CUE, to identify the SUE and the CUE based on the identifier information. For a process in which the SUE and the CUE search for a cell and a process in which the network device allocates the identifier information to the SUE and the CUE, refer to a current process in which UE accesses a network. Details are not described herein again.

In another example, the VUE may include one SUE and at least one CUE that is connected to the SUE in the wireless manner. In this case, the VUE may be considered as a group of terminal devices.

The SUE sends the data to the network device. It may be considered that the SUE splits the data into two parts. One part is sent to the network device by using the antenna of the SUE, and the other part is sent to the network device by using the antenna of the CUE. Alternatively, it may be considered that the SUE makes one copy of the data. One copy of the data is sent to the network device by using the antenna of the SUE, and the other copy of the data is sent to the network device by using the antenna of the CUE. For different forms of the VUE, protocol stacks of the SUE and the CUE for signaling and/or data interaction between each other may be different, and protocol stacks of the SUE, the CUE, and the network device for signaling and/or data interaction between each other may also be different. The following describes composition of the protocol stack for each of two forms of the VUE.

The VUE is a terminal device. To be specific, the SUE and the CUE are connected in the wired manner, and the SUE and the CUE may be considered as different modules of the VUE. In this case, the SUE and the CUE may share a set of protocol stacks. To be specific, each of the protocol stacks of the SUE and the CUE includes a PDCP layer, an RLC layer, a MAC layer, and a PHY layer. The SUE may split the data at a layer of the protocol stack, that is, output some data to the CUE at a layer, and the CUE sends the data to the network device. It should be noted that a layer at which the SUE splits the data is not limited in this embodiment of this application.

Figure 4:
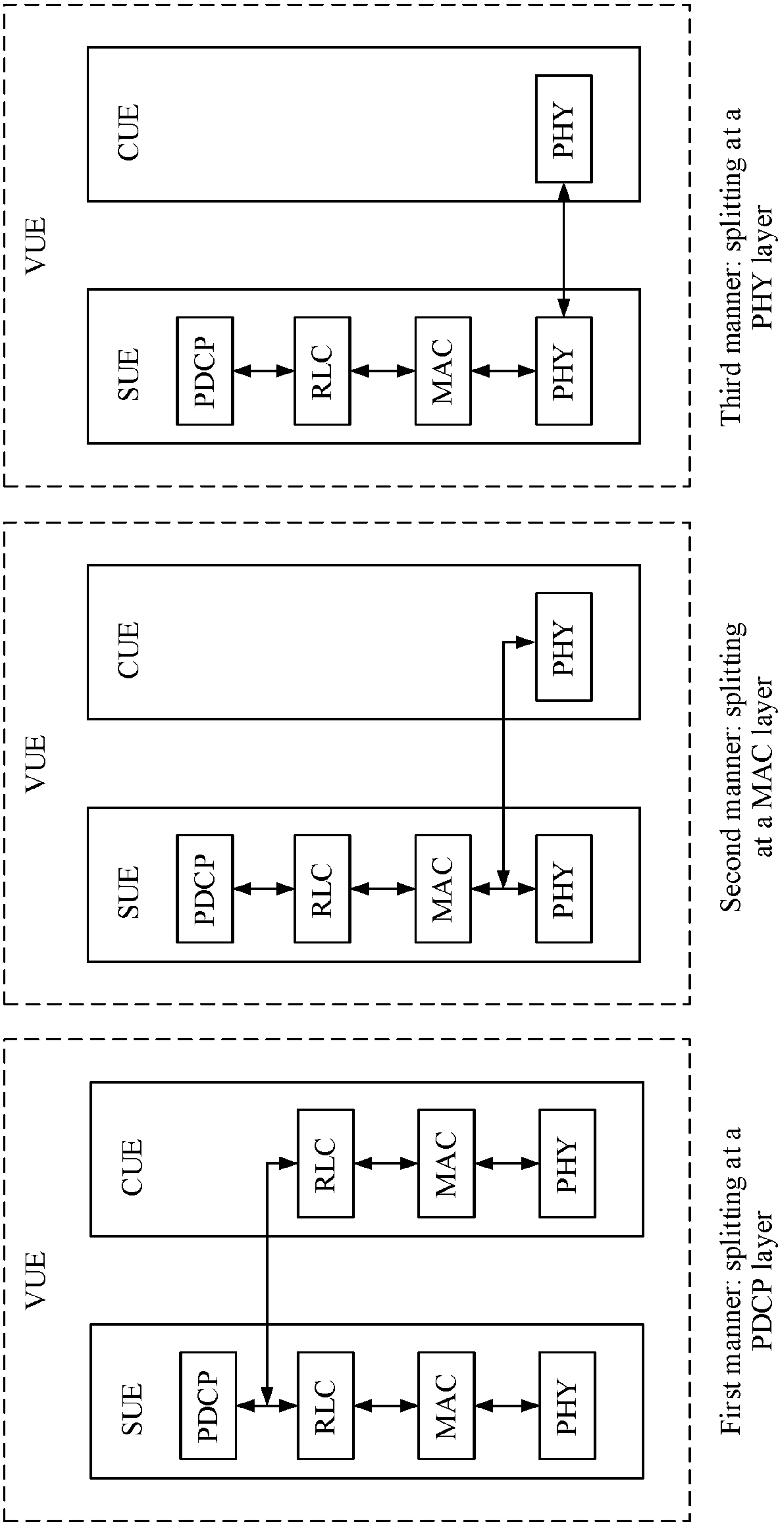
FIG. 4 is a schematic diagram of data splitting of VUE.

For example, FIG. 4 shows three manners in which SUE splits data. As shown in FIG. 4, data of the SUE may be split at a PDCP layer, may be split at a MAC layer, or may be split at a PHY layer. That the data of the SUE is split at the PDCP layer means that the SUE splits data of the PDCP layer into two parts. One part flows from the PDCP layer of the SUE to an RLC layer of the SUE, and the other part flows from the PDCP layer of the SUE to an RLC layer of CUE. In this case, one part of the data of the SUE is sent from the SUE to a network device, and the other part is sent from the CUE to the network device. Similarly, that the data of the SUE is split at the MAC layer means that the SUE splits data of the MAC layer into two parts. One part flows from the MAC layer of the SUE to the PHY layer of the SUE, and the other part flows from the MAC layer of the SUE to a PHY layer of the CUE. That the data of the SUE is split at the PHY layer means that the SUE splits data of the PHY layer into two parts. One part flows from the PHY layer of the SUE to the network device, and the other part flows to the PHY layer of the CUE, and flows from the PHY layer of the CUE to the network device.

VUE is a group of terminal devices, that is, the SUE and the CUE may be considered as independent terminal devices. In this case, the SUE may alternatively send some data to the CUE, and the CUE sends the data to the network device.

It should be understood that the terminal device may perform information exchange through a Uu interface between the terminal device and the network device. The terminal device may perform information exchange through a PC5 interface between the terminal device and another terminal device. In this embodiment of this application, the terminal device may alternatively perform information exchange through a private interface between the terminal device and another terminal device. This is not limited in this embodiment of this application. If the terminal devices exchange information based on the PC5 interface, protocol stacks of the SUE, the CUE, and the network device may be based on a protocol stack architecture of 3rd generation partnership project (3rd generation partnership project, 3GPP) relay (relay). Some data of the SUE forwarded by the CUE needs to be sent by the SUE to the CUE in advance through a sidelink (sidelink, SL).

Figure 5A:
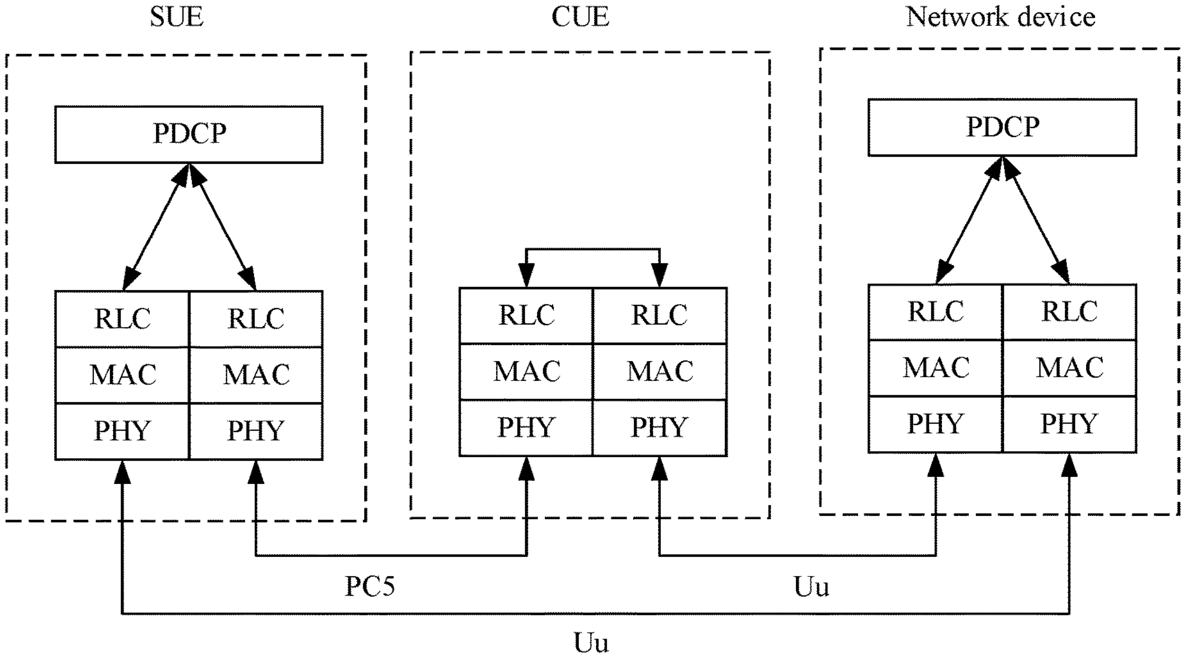
FIG. 5A is a schematic diagram of protocol stacks of SUE, CUE, and a network device according to an embodiment of this application.

For example, FIG. 5A is a schematic diagram of interfaces between the SUE, the CUE, and the network device. FIG. 5A uses an example in which the terminal devices exchange information through the PC5 interface between the terminal devices.

An interface between the SUE and the CUE is a PC5 interface. An interface between the SUE and the network device is a Uu interface. An interface between the CUE and the network device is a Uu interface. A PC5 interface protocol stack of the SUE includes an RLC layer, a MAC layer, and a PHY layer. A PC5 interface protocol stack of the CUE includes an RLC layer, a MAC layer, and a PHY layer. A Uu interface protocol stack between the SUE and the network device includes a PDCP layer, an RLC layer, a MAC layer, and a PHY layer. A Uu interface protocol stack between the CUE and the network device includes an RLC layer, a MAC layer, and a PHY layer. To be specific, it is assumed that the SUE splits data to be sent to the network device into two parts. In this case, the SUE sends one part of the data to the CUE through the RLC layer, the MAC layer, or the PHY layer in the PC5 interface protocol stack between the SUE and the CUE. The part of the data is sent to the network device through one or more of the RLC layer, the MAC layer, and the PHY layer in the PC5 interface protocol stack of the CUE, and then through one or more of the RLC layer, the MAC layer, and the PHY layer in the Uu interface protocol stack of the CUE. The SUE sends the other part of the data to the network device through the Uu interface.

Alternatively, protocol stacks of the SUE, the CUE, and the network device may not be based on a protocol stack architecture of 3GPP relay. To be specific, the protocol stacks of the SUE, the CUE, and the network device may be based on a protocol stack architecture of a non-3GPP protocol. For example, an adaptation layer may be added to each of the SUE and the CUE through a proprietary protocol, to perform signaling/data interaction between the SUE and the CUE.

Figure 5B:
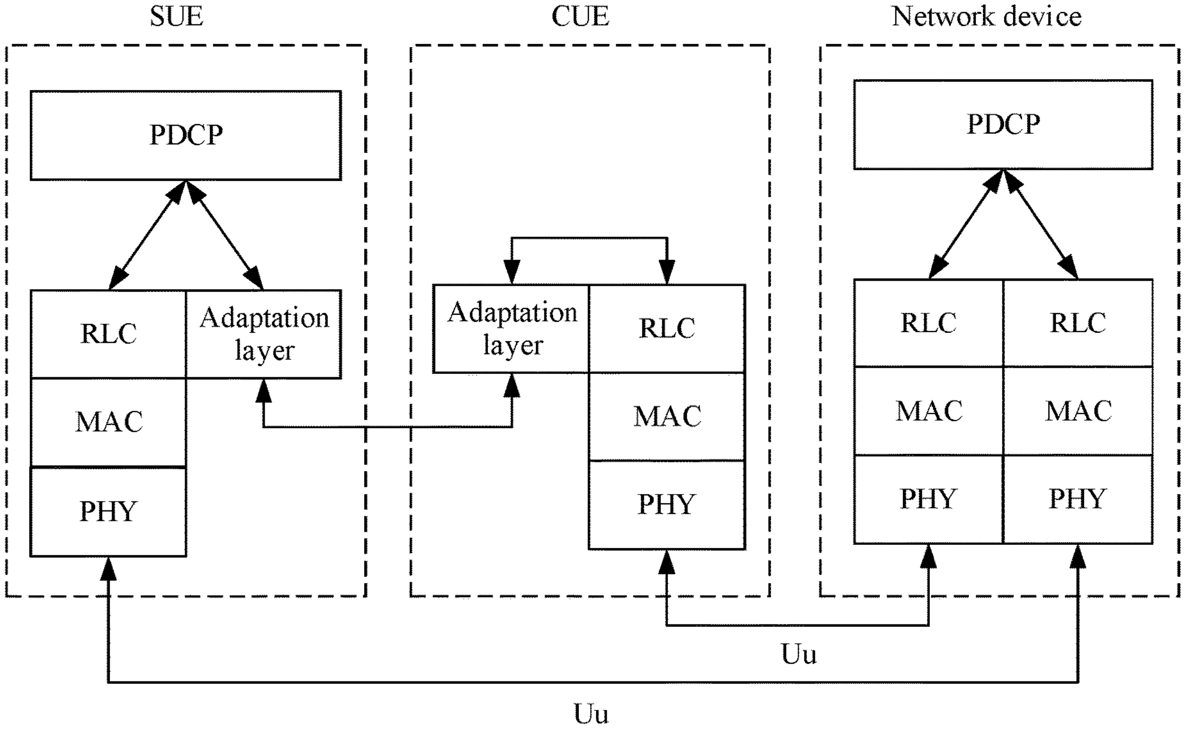
FIG. 5B is another schematic diagram of protocol stacks of SUE, CUE, and a network device according to an embodiment of this application.

FIG. 5B is a schematic diagram of interfaces between the SUE, the CUE, and the network device. FIG. 5B uses an example in which the terminal devices exchange information through the adaptation layer between the terminal devices. It is assumed that the SUE splits data to be sent to the network device into two parts. In this case, the SUE sends one part of the data to the CUE through the adaptation layer between the SUE and the CUE, and the CUE forwards the part of the data to the network device through a Uu interface. The SUE sends the other part of the data to the network device through a Uu interface.

(3) In embodiments of this application, unless otherwise specified, a number of a noun represents "a singular noun or a plural noun", that is, "one or more". "At least one" means one or more, and "a plurality of" means two or more. "And/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. For example, AB indicates A or B. "At least one of the following items" or a similar expression thereof means any combination of these items, including a singular item or any combination of plural items. For example, at least one of a, b, or c may represent: a, b, c, a and b, a and c, b and c, or a, b, and c, where a, b, and c may be singular or plural.

Ordinal numerals such as "first" and "second" mentioned in embodiments of this application are intended to distinguish between a plurality of objects, and are not intended to limit sizes, content, orders, time sequences, priorities, importance degrees, or the like of the plurality of objects. For example, first indication information and second indication information do not indicate a difference of amounts of information, content, priorities, importance degrees, or the like between the two pieces of indication information.

The technical solutions provided in embodiments of this application are described below in detail with reference to the accompanying drawings.

Figure 6A:
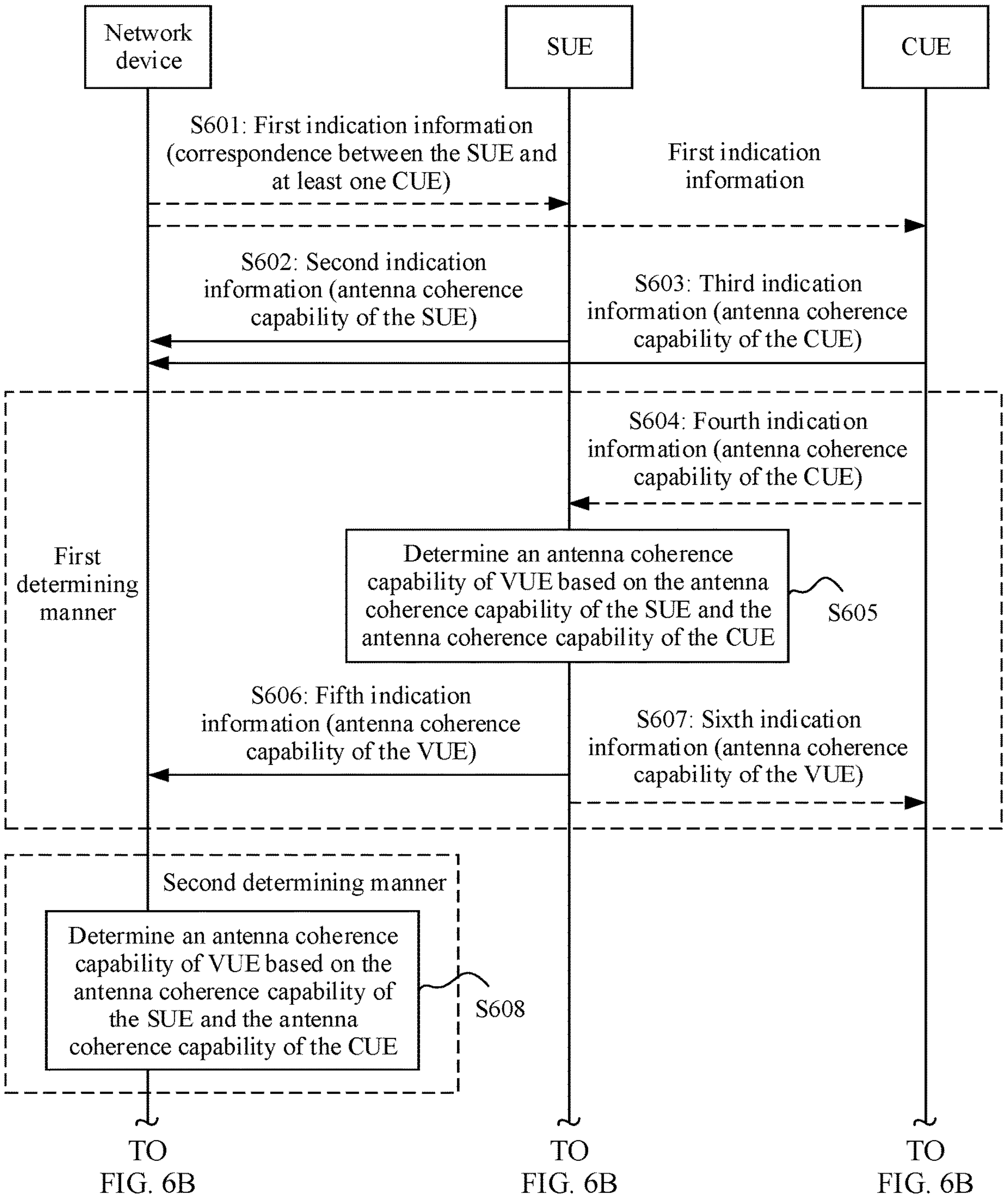
FIG. 6A and FIG. 6B are a schematic flowchart of an uplink data sending method and receiving method according to an embodiment of this application.
Figure 6B:
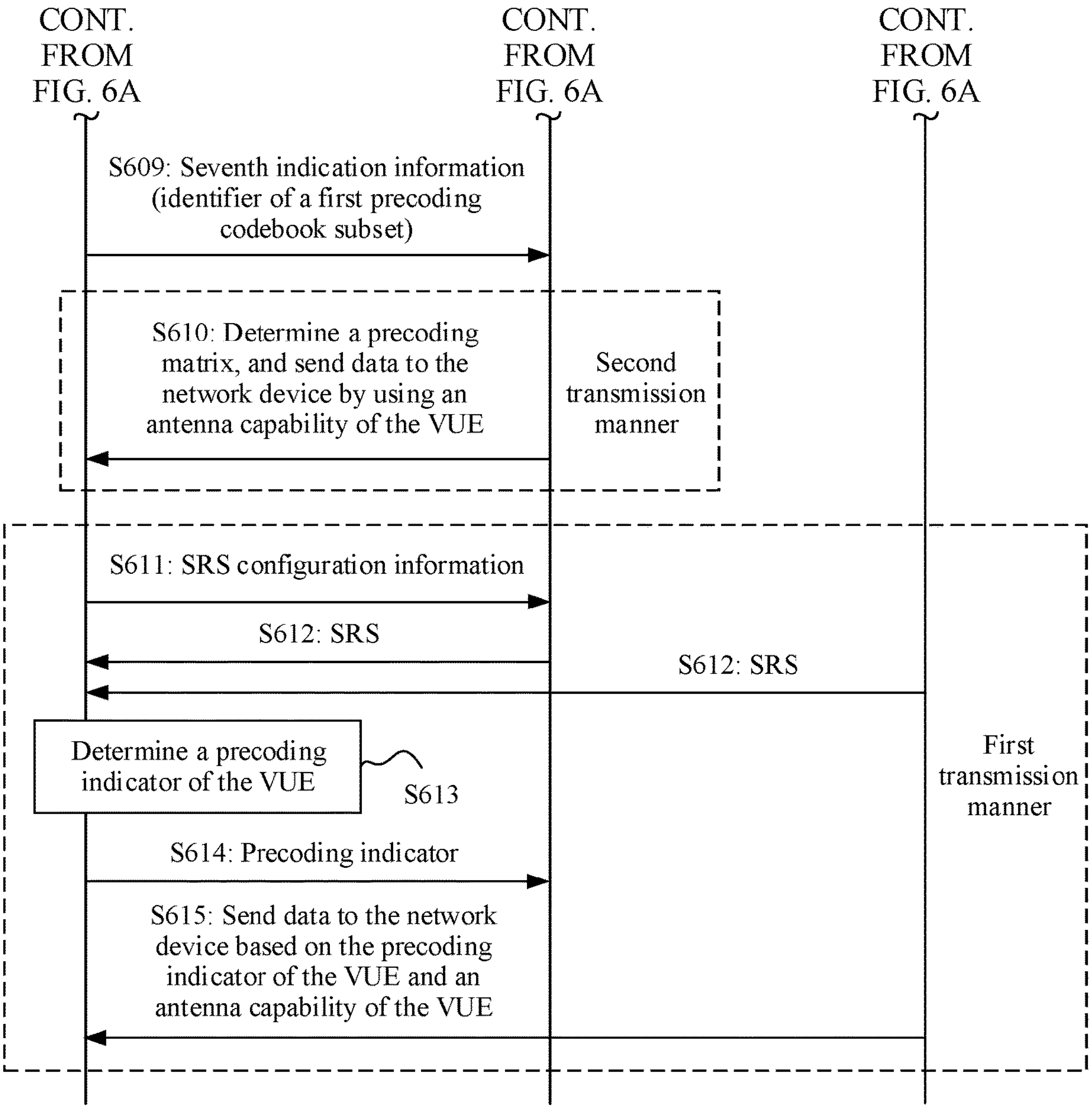

FIG. 6A and FIG. 6B show an uplink data sending method according to an embodiment of this application. The following description process uses an example in which the method is applied to the network architecture shown in FIG. 1. In addition, the method may be performed by three communication apparatuses. For example, the three communication apparatuses are a first communication apparatus, a second communication apparatus, and a third communication apparatus. The first communication apparatus may be a network device or a communication apparatus that can support a network device in implementing a function required in the method, may be a first terminal device or a communication apparatus that can support a first terminal device in implementing a function required in the method, may be a second terminal device or a communication apparatus that can support a second terminal device in implementing a function required in the method, or certainly may be another communication apparatus, for example, a chip system. The second communication apparatus and the third communication apparatus may also be a network device or a communication apparatus that can support a network device in implementing a function required in the method, may be a first terminal device or a communication apparatus that can support a first terminal device in implementing a function required in the method, may be a second terminal device or a communication apparatus that can support a second terminal device in implementing a function required in the method, or certainly may be another communication apparatus, for example, a chip system. Implementations of the first communication apparatus and the second communication apparatus are not limited. For example, the first communication apparatus may be a network device, the second communication apparatus is a first terminal device, and the third communication apparatus is a second terminal device. Alternatively, the first communication apparatus is a network device, the second communication apparatus is a communication apparatus that can support a first terminal device in implementing a function required in the method, and the third communication apparatus is a communication apparatus that can support a second terminal device in implementing a function required in the method.

For ease of description, the following uses an example in which the method is performed by a network device, SUE, and CUE. To be specific, the first communication apparatus is the network device, the second communication apparatus is the SUE, and the third communication apparatus is the CUE. If this embodiment is applied to the network architecture shown in FIG. 1, the network device described below may be the network device in the network architecture shown in FIG. 1. It should be noted that, for example, this embodiment of this application is performed by the network device, the SUE, and the CUE, but is not limited to the three communication apparatuses. For example, this embodiment of this application may alternatively be performed by a network device, SUE, and more CUEs. It should be understood that, when a plurality of CUEs are involved, each of the plurality of CUEs performs a same process. For ease of description, the following uses an example in which this embodiment of this application is performed by a network device, SUE, and one CUE.

S601: The network device sends first indication information to each of the SUE and the CUE, and correspondingly, the SUE and the CUE separately receive the first indication information. The first indication information indicates a correspondence between the SUE and at least one CUE.

In this embodiment of this application, an antenna capability of the SUE is insufficient to support the SUE in performing some services. Therefore, the network device may indicate one or more CUEs used to assist the SUE in sending data. In this way, when performing a service, the SUE may select to-be-aggregated CUE from the one or more CUEs indicated by the network device, and send data to the network device by using an antenna capability of VUE formed after aggregation.

It should be noted that a specific implementation of how the network device determines the CUE that can assist the SUE in sending the data is not limited in this embodiment of this application. For example, in a possible scenario, there are a plurality of SUEs, and there are a plurality of UEs near the plurality of SUEs. For one SUE, the network device may consider one or more UEs near the SUE as the CUE that can assist the SUE in sending the data. For another example, the network device may consider UE that is located near the SUE and whose quantity of antennas is greater than a quantity of antennas of the SUE as the CUE.

After determining the CUE that can assist the SUE, the network device may send the first indication information to the SUE, to notify the SUE of the CUE that can assist the SUE in sending the data. For example, the first indication information may indicate a correspondence between the SUE and at least one CUE. The first indication information may be carried in one or more of radio resource control (radio resource control, RRC) signaling, media access control control element (media access control element, MAC CE) signaling, downlink control information (downlink control information, DCI) signaling, or the like. One or more fields may be a field defined in the RRC signaling, a field defined in the MAC CE signaling, or a field defined in the DCI signaling, or may be a newly defined RRC field, MAC CE field, or DCI field. This is not limited in this embodiment of this application. Certainly, the first indication information may alternatively be carried in newly defined signaling. In addition, a specific name of the first indication information is not limited in this embodiment of this application. In addition, a specific implementation of the first indication information is not limited in this embodiment of this application.

For example, in some embodiments, the first indication information may include an identity document (Identity document, ID) of the SUE and an ID of at least one CUE. The SUE receives the first indication information, and may determine, based on the ID of the at least one CUE, at least one CUE that can assist the SUE. This is relatively direct.

In some other embodiments, the SUE and the CUE that can assist the SUE may be grouped into a group (group) in advance. For example, the group may include one SUE and at least one CUE. The first indication information may include an ID of the group. The ID indicates the group including the SUE and the at least one CUE. The SUE receives the first indication information, and may determine, based on the ID, that any CUE in the group corresponding to the ID can assist the SUE in sending the data. The CUE receives the first indication information, and may determine, based on the ID, that SUE corresponding to the CUE is the SUE in the group corresponding to the ID. Because the first indication information carries one ID, signaling overheads can be reduced.

It should be noted that the SUE may also determine, according to a specific rule, the CUE that can assist the SUE in sending the data, without needing the network device to indicate. For example, the SUE may determine UE in a specific range near the SUE as the CUE. Therefore, the step in which the network device sends the first indication information to the SUE is not a mandatory step, and is shown by using a dashed line in FIG. 6A.

It should be understood that a transmitting end sends data to a receiving end by using an antenna, and the receiving end needs to decode received data, to obtain original data sent by the transmitting end. The receiving end decodes the received data. To be specific, the receiving end determines, based on a mapping relationship between an element in a precoding codeword and an antenna port, data sent by the transmitting end on each antenna port. Therefore, to ensure that the receiving end correctly performs decoding, the transmitting end and the receiving end need to have consistent understandings of a mapping relationship between the data sent by using the antenna and the antenna port. In other words, the SUE sends data to the network device by using an antenna of the SUE and an antenna of the CUE, and the network device needs to decode received data, to obtain original data sent by the SUE. The SUE and the network device need to have consistent understandings of a mapping relationship between the data sent by using the antenna and the antenna port.

If data of the SUE is split at a PDCP layer, and data split to the CUE is mapped from a protocol stack of the CUE to an antenna port of the CUE through a protocol stack including an RLC layer, a MAC layer, or a PHY layer, the CUE needs to know a mapping relationship between an element in a precoding codeword and the antenna port of the CUE. Similarly, if data of the SUE is split at a PHY layer, and data split to the CUE is mapped from a protocol stack including a PHY layer of the CUE to an antenna port of the CUE, the CUE needs to know a mapping relationship between an element in a precoding codeword of the VUE and the antenna port of the CUE. If data of the SUE is split at a MAC layer, and data split to the CUE is mapped from a protocol stack including a PHY layer of the CUE to an antenna port of the CUE, the CUE also needs to know a mapping relationship between an element in a precoding codeword of the VUE and the antenna port of the CUE. However, if data of the SUE is split at a PHY layer, and split data is mapped from a protocol stack including a PHY layer of the SUE to antenna ports of the SUE and the CUE, the SUE only needs to know a mapping relationship between an element in a precoding codeword and an antenna port of the VUE, and the CUE does not need to know a mapping relationship between an element in a precoding codeword of the VUE and the antenna port of the CUE.

Therefore, if the VUE is a terminal device, the SUE splits the data to the CUE at the PHY layer. Even if the CUE does not know the terminal device that is the SUE corresponding to the CUE, impact of the network device on data of the CUE is not affected. In this case, the network device does not need to send the first indication information to the CUE. To be specific, the step in which the network device sends the first indication information to the CUE is not a mandatory step, and is shown by using a dashed line in FIG. 6A. Certainly, if the SUE splits the data at the PDCP layer or the MAC layer, the CUE assisting the SUE needs to know SUE corresponding to the CUE, that is, the network device needs to send the first indication information to the CUE.

S602: The SUE sends second indication information to the network device, and correspondingly, the network device receives the second indication information, where the second indication information indicates an antenna coherence capability of the SUE.

S603: The CUE sends third indication information to the network device, and correspondingly, the network device receives the third indication information, where the third indication information indicates an antenna coherence capability of the CUE.

The antenna coherence capability includes three types: fully coherent, partial coherent, non-coherent. The network device configures a precoding codebook subset for the terminal device based on an antenna coherence capability of the terminal device, so that the terminal device sends data by using the precoding codebook subset. After accessing the network device, any terminal device can report an antenna coherence capability of the terminal device to the network device. It should be noted that a sequence of performing S602 and S603 is not limited. S602 may be performed before S603, or may be performed after S603.

If the SUE does not send the data to the network device by using an antenna capability of the CUE, the network device configures a precoding codebook subset for the SUE based on the antenna coherence capability of the SUE. To be specific, an antenna coherence capability corresponding to the precoding codebook subset configured by the network device for the SUE is the antenna coherence capability of the SUE. If the SUE sends the data to the network device by using an antenna capability of the CUE, that is, the SUE sends the data to the network device by using the antenna capability of the VUE, the network device configures a precoding codebook subset for the SUE based on an antenna coherence capability of the VUE. To be specific, an antenna coherence capability corresponding to the precoding codebook subset configured by the network device for the SUE is the antenna coherence capability of the VUE.

Alternatively, it may be understood that, if the SUE does not send the data to the network device by using an antenna capability of the CUE, the network device configures a precoding codebook subset for the SUE based on a quantity of antenna ports of the SUE. To be specific, a quantity of antenna ports corresponding to the precoding codebook subset configured by the network device for the SUE is equal to the quantity of antenna ports of the SUE. If the SUE sends the data to the network device by using an antenna capability of the CUE, that is, the SUE sends the data to the network device by using the antenna capability of the VUE, the network device configures a precoding codebook subset for the SUE based on a quantity of antenna ports of the VUE. In this case, a quantity of antenna ports corresponding to the precoding codebook subset configured by the network device for the SUE is equal to the quantity of antenna ports of the VUE. It should be noted that, in this embodiment of this application, the precoding codebook subset configured by the network device for the SUE may be considered as a precoding codebook subset to be used by the SUE. The precoding codebook subset configured by the network device for the SUE based on the quantity of antenna ports of the VUE may be considered as a precoding codebook subset to be used by the VUE. For ease of description, the precoding codebook subset to be used by the VUE is referred to as a first precoding codebook subset below.

However, the network device does not know the antenna coherence capability of the VUE, and therefore cannot configure, for the SUE, a precoding codebook subset matching the antenna coherence capability of the VUE. Therefore, the network device needs to determine the antenna coherence capability of the VUE, to further determine the first precoding codebook subset. The following describes two manners in which the network device determines the antenna coherence capability of the VUE.

In a first determining manner, the SUE determines the antenna coherence capability of the VUE based on the antenna coherence capability of the SUE and the antenna coherence capability of the CUE, and notifies the network device of the antenna coherence capability of the VUE.

S604: The CUE sends fourth indication information to the SUE, and correspondingly, the SUE receives the fourth indication information, where the fourth indication information indicates the antenna coherence capability of the CUE.

S605: The SUE determines the antenna coherence capability of the VUE based on the antenna coherence capability of the SUE and the antenna coherence capability of the CUE.

The CUE may notify the SUE of the antenna coherence capability of the CUE, so that the SUE determines the antenna coherence capability of the VUE. For example, the CUE may send the fourth indication information to the SUE, where the fourth indication information may indicate the antenna coherence capability of the CUE. The fourth indication information may be carried in PC5 RRC signaling, SLMAC CE signaling, sidelink control information (sidelink control information, SCI), or other possible interface signaling. The SUE receives the fourth indication information, and may determine, based on the antenna coherence capability of the SUE and the antenna coherence capability of the CUE, whether antennas of the VUE may be phase-synchronous, to determine the antenna coherence capability of the VUE. Because the antenna coherence capability of the CUE that is learned by the SUE is an actual antenna coherence capability of the CUE, the antenna coherence capability of the VUE that is determined by the SUE based on the antenna coherence capability of the SUE and the antenna coherence capability of the CUE is accurate.

In an alternative implementation, the SUE may consider by default that an antenna of the SUE is not coherent with an antenna of the CUE. In this case, the SUE determines the antenna coherence capability of the VUE based on the antenna coherence capability of the SUE and the antenna coherence capability of the CUE. Because the SUE considers by default that the antenna of the SUE is not coherent with the antenna of the CUE, the CUE does not need to report the antenna coherence capability of the CUE. This can reduce signaling overheads. In other words, S604 is not a mandatory step, and is shown by using a dashed line in FIG. 6A.

Table 1 shows a correspondence between antenna coherence capabilities of the SUE, the CUE, and the VUE. In Table 1, an example in which the antenna of the SUE is not coherent with the antenna of the CUE is used.

TABLE 1

| | CUE | | |
|---|---|---|---|
| SUE | Fully coherent | Partial coherent | Non-coherent |
| Fully coherent | Partial coherent | Partial coherent | Partial coherent |
| Partial coherent | Partial coherent | Partial coherent | Partial coherent |
| Non-coherent | Non-coherent | Non-coherent | Non-coherent |

S606: The SUE sends fifth indication information to the network device, and correspondingly, the network device receives the fifth indication information, where the fifth indication information indicates the antenna coherence capability of the VUE.

After determining the antenna coherence capability of the VUE, the SUE notifies the network device of the antenna coherence capability of the VUE, so that the network device can determine the antenna coherence capability of the VUE. For example, the SUE may send the fifth indication information to the network device, where the fifth indication information indicates the antenna coherence capability of the VUE. The fifth indication information may be carried in a pusch-TransCoherence indication field included in the RRC signaling. An optional value of the indication field is nonCoherent, partialCoherent, or fullCoherent.

The terminal device usually has only one antenna coherence capability. Therefore, the terminal device needs to report the antenna coherence capability to the network device only once. However, in this embodiment of this application, the SUE may send the data by using the antenna capability of the SUE, or may aggregate the antenna capability of the CUE and send the data by using the antenna capability of the VUE. For example, some services require a low data rate, and the quantity of antennas of the SUE is sufficient to support a service to be performed by the SUE. In this case, the SUE does not need to aggregate the antenna capability of the CUE. On the contrary, some services require a high data rate, and the quantity of antennas of the SUE is insufficient to support the service to be performed by the SUE. In this case, the SUE may aggregate the antenna capability of the CUE. If the SUE does not use the antenna capability of the VUE, the SUE does not need to notify the network device of the antenna coherence capability of the VUE. Therefore, in some embodiments, the SUE may determine, based on an actual requirement, whether to send the fifth indication information. For example, if one or more of the following preset conditions are met, the SUE sends the fifth indication information to the network device.

For example, the preset condition may be that the SUE receives the first indication information. If the network device sends the first indication information to the SUE, it may be considered that the SUE needs to aggregate the antenna capability of the CUE. In this case, the SUE may send the fifth indication information to the network device. On the contrary, if the SUE does not receive the first indication information, it may be considered that the network device does not send the first indication information to the SUE, and the SUE does not need to aggregate the antenna capability of the CUE. In this case, the SUE may not send the fifth indication information to the network device.

For example, the preset condition may be that a data rate of data to be sent by the SUE is greater than or equal to a first preset threshold. The first preset threshold may be a predefined possible value, or may be a possible value agreed upon by the SUE and the network device. It should be understood that, to obtain a higher data rate, the SUE needs to aggregate the antenna capability of the CUE. Therefore, in this case, the SUE may send the fifth indication information to the network device. On the contrary, if a data rate of data to be sent by the SUE is less than a first preset threshold, it may be considered that the antenna capability of the SUE is sufficient to reach the data rate, and the SUE may not send the fifth indication information to the network device.

For example, the preset condition may be that the quantity of antennas of the SUE is less than or equal to a second preset threshold. The second preset threshold may be a predefined possible value. If the SUE has a small quantity of antennas, the antenna capability of the SUE may be insufficient to support the service to be performed by the SUE, and it may be considered that the SUE needs to aggregate the antenna capability of the CUE. In this case, the SUE may send the fifth indication information to the network device. On the contrary, if the quantity of antennas of the SUE is greater than a second preset threshold, it may be considered that the antenna capability of the SUE is sufficient to support the service to be performed by the SUE, and the SUE may not send the fifth indication information to the network device.

It should be noted that, that the SUE does not send the fifth indication information to the network device may also be understood as that the SUE does not report the antenna coherence capability of the VUE to the network device, but re-reports the antenna coherence capability of the SUE to the network device. To be specific, the SUE may dynamically report the antenna coherence capability to the network device based on an actual requirement.

S607: The SUE sends sixth indication information to the CUE, and correspondingly, the network device receives the sixth indication information, where the sixth indication information indicates the antenna coherence capability of the VUE.

As described above, the SUE sends the data to the network device by using the antenna capability of the CUE. It may be considered that the data sent by the SUE to the network device may be split into two parts. One part is sent by the SUE to the network device, and the other part may be forwarded to the network device through the CUE. However, the CUE does not know the antenna coherence capability of the VUE. As a result, the SUE and the CUE may have inconsistent understandings of the mapping relationship between the data sent by using the antenna and the antenna port, and consequently, an antenna port mapped to the CUE does not match the precoding codeword. Therefore, the SUE determines the antenna coherence capability of the VUE, and may notify the CUE of the antenna coherence capability of the VUE, to ensure that the antenna port mapped to the CUE matches the precoding codeword. Certainly, if the SUE splits the data at the PHY layer, the CUE does not need to know the antenna coherence capability of the VUE. Therefore, S607 is an optional step, and is shown by using a dashed line in FIG. 6A.

In a second determining manner, the network device determines the antenna coherence capability of the VUE based on the antenna coherence capability of the SUE and the antenna coherence capability of the CUE. In this manner, the SUE does not need to additionally report the antenna coherence capability of the VUE. This can reduce signaling interaction.

S608: The network device determines the antenna coherence capability of the VUE based on the antenna coherence capability of the SUE and the antenna coherence capability of the CUE.

The SUE and the CUE may separately report the antenna coherence capabilities of the SUE and the CUE to the network device. Therefore, if the network device considers by default that the antenna of the SUE is not coherent with the antenna of the CUE, the network device may determine the antenna coherence capability of the VUE based on the antenna coherence capability of the SUE and the antenna coherence capability of the CUE. For example, Table 2 shows a correspondence between the antenna coherence capabilities of the SUE, the CUE, and the VUE. In Table 2, an example in which the antenna of the SUE is not coherent with the antenna of the CUE is used.

TABLE 2

| | CUE | | |
|---|---|---|---|
| SUE | Fully coherent | Partial coherent | Non-coherent |
| Fully coherent | Partial coherent | Partial coherent | Partial coherent |
| Partial coherent | Partial coherent | Partial coherent | Partial coherent |
| Non-coherent | Partial coherent | Partial coherent | Non-coherent |

It should be understood that, after S603, S604 to S607 may be performed, and S608 is not performed. Alternatively, after S603, S608 may be performed, and S604 to S607 are not performed. In other words, the first determining manner or the second determining manner may be selected (as shown in FIG. 6A).

After learning the antenna coherence capability of the VUE, the network device determines the first precoding codebook subset based on the antenna coherence capability of the VUE. A manner in which the network device determines the first precoding codebook subset based on the antenna coherence capability of the VUE is also the same as a manner in which the network device determines a precoding codebook subset based on an antenna coherence capability of UE. In conclusion, use of the precoding codebook subset configured by the network device for the UE does not exceed the antenna capability of the UE.

For example, when the antenna coherence capability of the VUE is "nonCoherent", that is, non-coherent, the precoding codebook subset configured by the network device for the SUE is indicated as nonCoherent. For another example, when the antenna coherence capability of the VUE is "partialCoherent", that is, partial coherent, the precoding codebook subset configured by the network device for the SUE is indicated as partial and nonCoherent, or the precoding codebook subset configured by the network device for the SUE is indicated as nonCoherent. For another example, when the antenna coherence capability of the VUE is "fullCoherent", that is, fully coherent, the precoding codebook subset configured by the network device for the SUE is indicated as fully and partial and nonCoherent, partial and nonCoherent, or nonCoherent.

The precoding codebook subset is a subset of a precoding codeword set. A plurality of tables are configured based on different quantities of antenna ports and layers. Each table indicates the precoding codeword set. An example in which the quantity of antenna ports of the VUE is four, and transmission is performed at two layers (layers) is used. The precoding codeword set may be shown in Table 3.

TABLE 3

| Precoding matrix W for transmission at two layers using four antenna ports | | | | |
|---|---|---|---|---|
| Transmitted precoding matrix indicator (transmitted precoding matrix indicator, TPMI) index (index) | W<br>Ordered from left to right in increasing order of TPMI index (ordered from left to right in increasing order of TPMI index) | | | |
| 0-3 | $\frac{1}{2}\begin{bmatrix}1 & 0\\0 & 1\\0 & 0\\0 & 0\end{bmatrix}$ | $\frac{1}{2}\begin{bmatrix}1 & 0\\0 & 0\\0 & 1\\0 & 0\end{bmatrix}$ | $-\frac{1}{2}\begin{bmatrix}1 & 0\\0 & 0\\0 & 0\\0 & 1\end{bmatrix}$ | $\frac{1}{2}\begin{bmatrix}0 & 0\\1 & 0\\0 & 1\\0 & 0\end{bmatrix}$ |
| 4-7 | $\frac{1}{2}\begin{bmatrix}0 & 0\\1 & 0\\0 & 0\\0 & 1\end{bmatrix}$ | $\frac{1}{2}\begin{bmatrix}0 & 0\\0 & 0\\1 & 0\\0 & 1\end{bmatrix}$ | $\frac{1}{2}\begin{bmatrix}1 & 0\\0 & 1\\1 & 0\\0 & -j\end{bmatrix}$ | $\frac{1}{2}\begin{bmatrix}1 & 0\\0 & 1\\1 & 0\\0 & j\end{bmatrix}$ |
| 8-11 | $\frac{1}{2}\begin{bmatrix}1 & 0\\0 & 1\\-j & 0\\0 & 1\end{bmatrix}$ | $\frac{1}{2}\begin{bmatrix}1 & 0\\0 & 1\\-j & 0\\0 & -1\end{bmatrix}$ | $\frac{1}{2}\begin{bmatrix}1 & 0\\0 & 1\\-1 & 0\\0 & -j\end{bmatrix}$ | $\frac{1}{2}\begin{bmatrix}1 & 0\\0 & 1\\-1 & 0\\0 & j\end{bmatrix}$ |
| 12-15 | $\frac{1}{2}\begin{bmatrix}1 & 0\\0 & 1\\j & 0\\0 & 1\end{bmatrix}$ | $\frac{1}{2}\begin{bmatrix}1 & 0\\0 & 1\\j & 0\\0 & -1\end{bmatrix}$ | $\frac{1}{2\sqrt{2}}\begin{bmatrix}1 & 1\\1 & 1\\1 & -1\\1 & -1\end{bmatrix}$ | $\frac{1}{2\sqrt{2}}\begin{bmatrix}1 & 1\\1 & 1\\j & -j\\j & -j\end{bmatrix}$ |
| 16-19 | $\frac{1}{2\sqrt{2}}\begin{bmatrix}1 & 1\\j & j\\1 & -1\\j & -j\end{bmatrix}$ | $\frac{1}{2\sqrt{2}}\begin{bmatrix}1 & 1\\j & j\\j & -j\\-1 & 1\end{bmatrix}$ | $\frac{1}{2\sqrt{2}}\begin{bmatrix}1 & 1\\-1 & -1\\1 & -1\\-1 & 1\end{bmatrix}$ | $\frac{1}{2\sqrt{2}}\begin{bmatrix}1 & 1\\-1 & -1\\j & -j\\-j & j\end{bmatrix}$ |

TABLE 3-continued

Precoding matrix W for transmission at two layers using four antenna ports

| Transmitted precoding matrix indicator (transmitted precoding matrix indicator, TPMI) index (index) | W<br>Ordered from left to right in increasing order of TPMI index (ordered from left to right in increasing order of TPMI index) | | | |
|---|---|---|---|---|
| 20-21 | $\frac{1}{2\sqrt{2}}\begin{bmatrix} 1 & 1 \\ -j & -j \\ 1 & -1 \\ -j & j \end{bmatrix}$ | $\frac{1}{2\sqrt{2}}\begin{bmatrix} 1 & 1 \\ -j & -j \\ j & -j \\ 1 & -1 \end{bmatrix}$ | — | — |

The first precoding codebook subset varies based on different antenna coherence capabilities of the UE. For example, refer to Table 4. If the antenna coherence capability of the VUE reported by the SUE is nonCoherent, the network device may determine that the codebook subset configured for the SUE is the precoding codeword set in Table 3. For example, if the SUE performs transmission at two layers based on antenna ports of the VUE, that is, by using four antenna ports, the network device may determine that TPMI indexes corresponding to the precoding codebook subset are 0 to 5. In other words, a codeword set corresponding to the TPMI indexes 0 to 5 is the first precoding codebook subset.

TABLE 4

| Bit field mapped to index (bit field mapped to index) | Type of the codebook subset is non-coherent (codebookSubset = nonCoherent) |
|---|---|
| 0 | 1 layer: TPMI = 0 |
| 1 | 1 layer: TPMI = 1 |
| . . . | . . . |
| 3 | 1 layer: TPMI = 3 |
| 4 | 2 layers: TPMI = 0 |
| . . . | . . . |
| 9 | 2 layers: TPMI = 5 |
| 10 | 3 layers: TPMI = 0 |
| 11 | 4 layers: TPMI = 0 |
| 12-15 | Reserved (reserved) |

For example, refer to Table 5. If the antenna coherence capability of the VUE reported by the SUE is partialCoherent, the network device may determine that the codebook subset configured for the SUE is the precoding codeword set in Table 5. For example, if the SUE performs transmission at two layers based on antenna ports of the VUE, that is, by using four antenna ports, the network device may determine that TPMI indexes corresponding to the precoding codebook subset are 0 to 5 and 6 to 13. In other words, a codeword set corresponding to the TPMI indexes 0 to 5 and 6 to 13 is the first precoding codebook subset.

TABLE 5

| Bit field mapped to index | Type of the codebook subset is partial coherent and non-coherent (codebookSubset = partialAndNonCoherent) |
|---|---|
| 0 | 1 layer: TPMI = 0 |
| 1 | 1 layer: TPMI = 1 |
| . . . | . . . |
| 3 | 1 layer: TPMI = 3 |
| 4 | 2 layers: TPMI = 0 |
| . . . | . . . |
| 9 | 2 layers: TPMI = 5 |
| 10 | 3 layers: TPMI = 0 |
| 11 | 4 layers: TPMI = 0 |

TABLE 5-continued

| Bit field mapped to index | Type of the codebook subset is partial coherent and non-coherent (codebookSubset = partialAndNonCoherent) |
|---|---|
| 12 | 1 layer: TPMI = 4 |
| . . . | . . . |
| 19 | 1 layer: TPMI = 11 |
| 20 | 2 layers: TPMI = 6 |
| . . . | . . . |
| 27 | 2 layers: TPMI = 13 |
| 28 | 3 layers: TPMI = 1 |
| 29 | 3 layers: TPMI = 2 |
| 30 | 4 layers: TPMI = 1 |
| 31 | 4 layers: TPMI = 2 |

For example, refer to Table 6. If the antenna coherence capability of the VUE reported by the SUE is fullCoherent, the network device may determine that the codebook subset configured for the SUE is the precoding codeword set in Table 6. For example, if the SUE performs transmission at two layers based on antenna ports of the VUE, that is, by using four antenna ports, the network device may determine that TPMI indexes corresponding to the precoding codebook subset are 0 to 5, 6 to 13, and 14 to 21. In other words, a codeword set corresponding to the TPMI indexes 0 to 5, 6 to 13, and 14 to 21 is the first precoding codebook subset.

TABLE 6

| Bit field mapped to index | Type of the codebook subset is partial coherent, non-coherent, and fully coherent (codebookSubset = fullyAndPartialAndNonCoherent) |
|---|---|
| 0 | 1 layer: TPMI = 0 |
| 1 | 1 layer: TPMI = 1 |
| . . . | . . . |
| 3 | 1 layer: TPMI = 3 |
| 4 | 2 layers: TPMI = 0 |
| . . . | . . . |
| 9 | 2 layers: TPMI = 5 |
| 10 | 3 layers: TPMI = 0 |
| 11 | 4 layers: TPMI = 0 |
| 12 | 1 layer: TPMI = 4 |
| . . . | . . . |
| 19 | 1 layer: TPMI = 11 |
| 20 | 2 layers: TPMI = 6 |
| . . . | . . . |
| 27 | 2 layers: TPMI = 13 |
| 28 | 3 layers: TPMI = 1 |
| 29 | 3 layers: TPMI = 2 |
| 30 | 4 layers: TPMI = 1 |
| 31 | 4 layers: TPMI = 2 |
| 32 | 1 layer: TPMI = 12 |
| . . . | . . . |
| 47 | 1 layer: TPMI = 27 |
| 48 | 2 layers: TPMI = 14 |
| . . . | . . . |
| 55 | 2 layers: TPMI = 21 |
| 56 | 3 layers: TPMI = 3 |

TABLE 6-continued

| Bit field mapped to index | Type of the codebook subset is partial coherent, non-coherent, and fully coherent (codebookSubset = fullyAndPartialAndNonCoherent) |
|---|---|
| . . . | . . . |
| 59 | 3 layers: TPMI = 6 |
| 60 | 4 layers: TPMI = 3 |
| 61 | 4 layers: TPMI = 4 |
| 62-63 | Reserved |

S609: The network device sends seventh indication information to the SUE, and correspondingly, the SUE receives the seventh indication information, where the seventh indication information indicates the first precoding codebook subset.

After determining the first precoding codebook subset, the network device notifies the SUE of the first precoding codebook subset. The SUE sends uplink data based on the first precoding codebook subset. For example, the seventh indication information may include identifier information of the first precoding codebook subset. The seventh indication information may be carried in an RRC message. The RRC message may include a codebookSubset indication field. An optional value of the indication field is fully and partial and nonCoherent, partial and nonCoherent, or nonCoherent.

It should be understood that the CUE also sends uplink data based on the first precoding codebook subset. Therefore, after receiving the seventh indication information, the SUE may forward the seventh indication information to the CUE. Alternatively, the network device may send the seventh indication information to each of the SUE and the CUE. FIG. 6A and FIG. 6B use an example in which the SUE is used as an anchor of the CUE, that is, the SUE forwards the seventh indication information to the CUE (FIG. 6A and FIG. 6B do not show that the SUE forwards the seventh indication information to the CUE). It should be understood that when the SUE forwards the seventh indication information to the CUE, the SUE actually forwards the identifier information of the first precoding codebook subset to the CUE. The identifier information of the first precoding codebook subset may be carried in the PC5 RRC signaling, the SLMAC CE signaling, the SCI, or other possible interface signaling.

After determining the first precoding codebook subset, the SUE may send the data based on a codebook transmission manner (for example, a first transmission manner in FIG. 6B, refer to S611 to S615), or may send the data based on a non-codebook transmission manner (for example, a second transmission manner in FIG. 6B, refer to S610). It should be understood that only one of the first transmission manner and the second transmission manner needs to be selected.

S610: The SUE determines a precoding matrix, and sends the data to the network device by using the antenna capability of the VUE.

The SUE determines the precoding matrix based on the non-codebook transmission manner, that is, the SUE determines the precoding matrix by itself without participation of the network device. For example, the SUE randomly selects a precoding matrix from the first precoding codebook subset, determines a codeword by using the precoding matrix, and codes to-be-sent data. Alternatively, the SUE selects a precoding matrix with a highest or relatively high historical transmission success rate from the first precoding codebook subset, determines a codeword by using the precoding matrix, and codes to-be-sent data.

A random precoding matrix of the terminal device cannot ensure a data transmission success rate of the precoding matrix. Therefore, the network device indicates a precoding matrix for the terminal device, and the terminal device determines, based on the precoding matrix indicated by the network device, a codeword for coding data, to maximize the data transmission success rate.

S611: The network device sends sounding reference signal (sounding reference signal, SRS) configuration information of the VUE to the SUE, and correspondingly, the SUE receives the SRS configuration information.

S612: The SUE and the CUE send an SRS to the network device.

The SRS configuration information may indicate a time-frequency resource for sending the SRS. The SUE receives the SRS configuration information, and may forward the SRS configuration information to the CUE (FIG. 6A and FIG. 6B use this as an example). Alternatively, in S611, the network device may send the SRS configuration information to each of the SUE and the CUE. The SUE and the CUE receive the SRS configuration information, and may send the SRS to the network device based on the SRS configuration information. The network device may determine, based on the received SRS, channel state information corresponding to the SUE and the CUE. The network device may determine the precoding matrix based on the channel state information, to maximize the data transmission success rate.

S613: The network device determines a precoding indicator of VUE.

S614: The network device sends the precoding indicator of the VUE to the SUE.

The network device may determine, by measuring the SRS and based on the antenna coherence capability of the VUE, a precoding matrix used for uplink transmission of the VUE, and notify the SUE of the precoding matrix. For example, the network device may send the precoding indicator of the VUE to the SUE. The precoding indicator indicates one codeword in the first precoding codebook subset. The precoding indicator of the VUE may be carried in the DCI or a UL grant. After receiving the precoding indicator of the VUE and determining precoding indicated by the precoding indicator of the VUE, the SUE may notify the CUE of the precoding (FIG. 6A and FIG. 6B use this as an example). Alternatively, in S614, the network device may further send the precoding indicator of the VUE to the CUE.

S615: The SUE sends the data to the network device based on the precoding indicator of the VUE and the antenna capability of the VUE.

The SUE may determine the precoding matrix based on the precoding indicator, and then determine a corresponding precoding codeword from the first precoding codebook subset, to code the to-be-sent data. There is a correspondence between an element in a precoding codeword used by any terminal device and an antenna port, and the terminal device and the network device have consistent understandings of the correspondence. For example, the SUE includes two antennas, and a correspondence between an element in the precoding codeword used by the SUE and two antenna ports is consistent for the SUE and the network device. However, the SUE sends the data by using the antenna capability of the VUE. For example, the SUE includes two antennas, and the CUE includes two antennas, that is, the VUE includes four antennas. The SUE and the network device may have inconsistent understandings of a correspondence between the four antennas of the VUE and the element in the precoding codeword. To ensure that the SUE and the network device have consistent understandings of the correspondence between the element in the precoding codeword and the antenna port, in this embodiment of this application, an antenna port index of the VUE may be renumbered.

In an example, starting from 1, an antenna port index number of the SUE may be determined as an odd number, and starting from 2, an antenna port index number of the CUE may be determined as an even number. For example, the SUE includes two antennas, the CUE includes two antennas, antenna port index numbers of the SUE are 1 and 3, and antenna port index numbers of the CUE are 2 and 4. In this way, antenna port index numbers of the four antennas of the VUE are consistent for the SUE and the network device.

In another example, the antenna ports of the SUE and the CUE may be sequentially numbered. For example, the SUE includes two antennas, the CUE includes two antennas, antenna port index numbers of the SUE are 1 and 2, and antenna port index numbers of the CUE are 3 and 4. In this way, antenna port index numbers of the four antennas of the VUE are consistent for the SUE and the network device.

In this embodiment of this application, the SUE may aggregate the antenna capability of the CUE, so that the SUE can use a larger antenna capability. The SUE sends the uplink data by using the larger antenna capability, namely, the antenna capability of the VUE, and the network device configures a precoding codebook for the SUE based on the antenna coherence capability of the VUE. This increases a transmission rate of the uplink data sent by the SUE.

It should be understood that the network device determines the antenna coherence capability of the VUE essentially to determine the first precoding codebook subset. In the embodiment shown in FIG. 6A and FIG. 6B, the network device determines the first precoding codebook subset based on the antenna coherence capability of the VUE. For example, the network device first determines the first precoding codebook subset based on the antenna coherence capability of the VUE. In this manner, the CUE reports the antenna coherence capability of the CUE to the SUE. This can be better compatible with a current antenna coherence capability reporting mechanism, without increasing more signaling overheads.

In an alternative solution, the network device may determine the first precoding codebook subset without using the antenna coherence capability of the VUE. For example, the network device may determine a first precoding codebook subset that can be used by the VUE, and further determine the first precoding codebook subset from precoding codebook subsets that can be used, without determining the antenna coherence capability of the VUE. In comparison with determining the first precoding codebook subset based on the antenna coherence capability of the VUE, because the first precoding codebook subset that can be used by the VUE is determined from precoding codebook subsets that can be used by the first terminal device and the second terminal device, a codeword included in the first precoding codebook subset that can be used by the VUE is more accurate, and is more suitable for the first terminal device to send data.

Figure 7A:
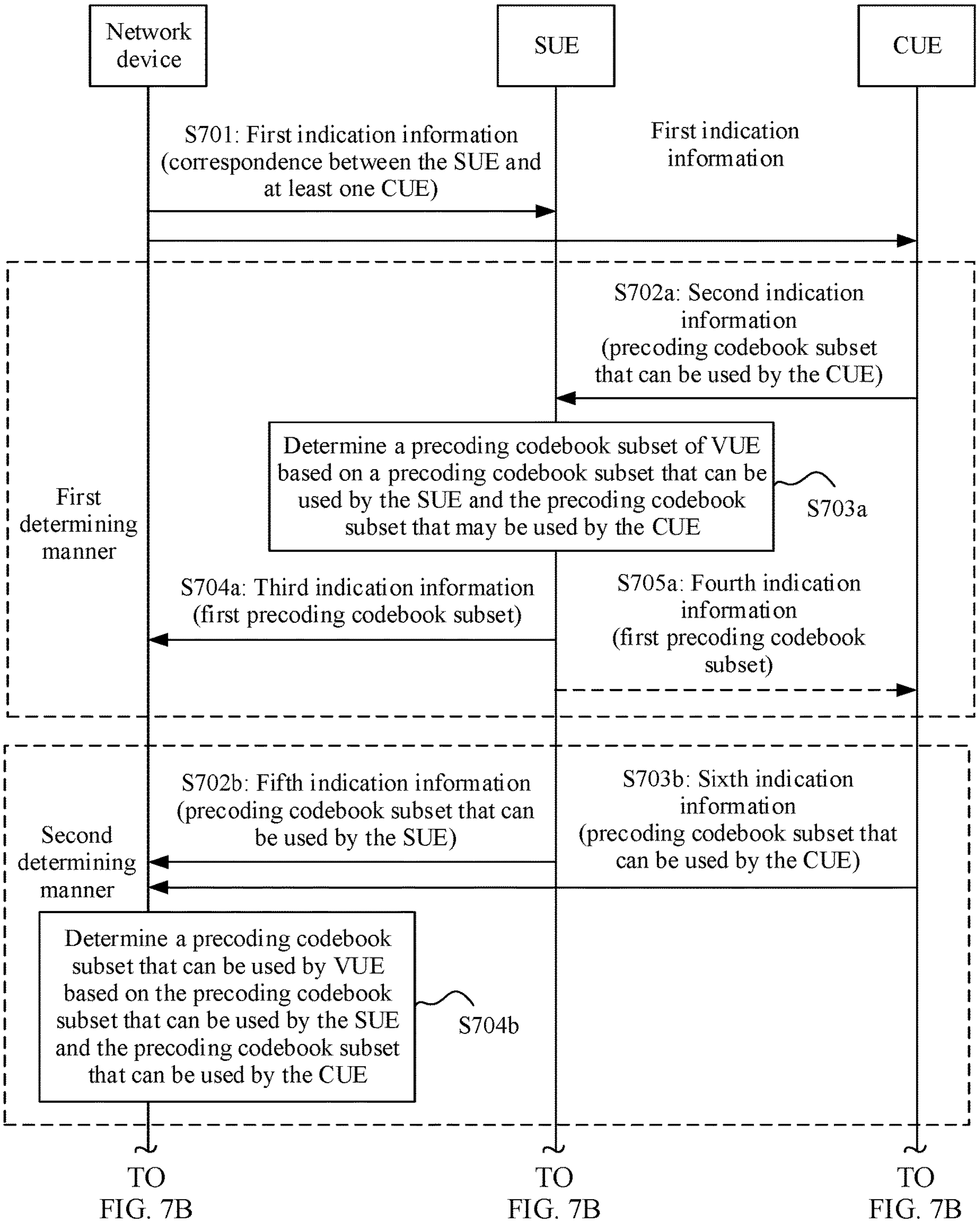
FIG. 7A and FIG. 7B are a schematic flowchart of an uplink data sending method and receiving method according to an embodiment of this application.
Figure 7B:
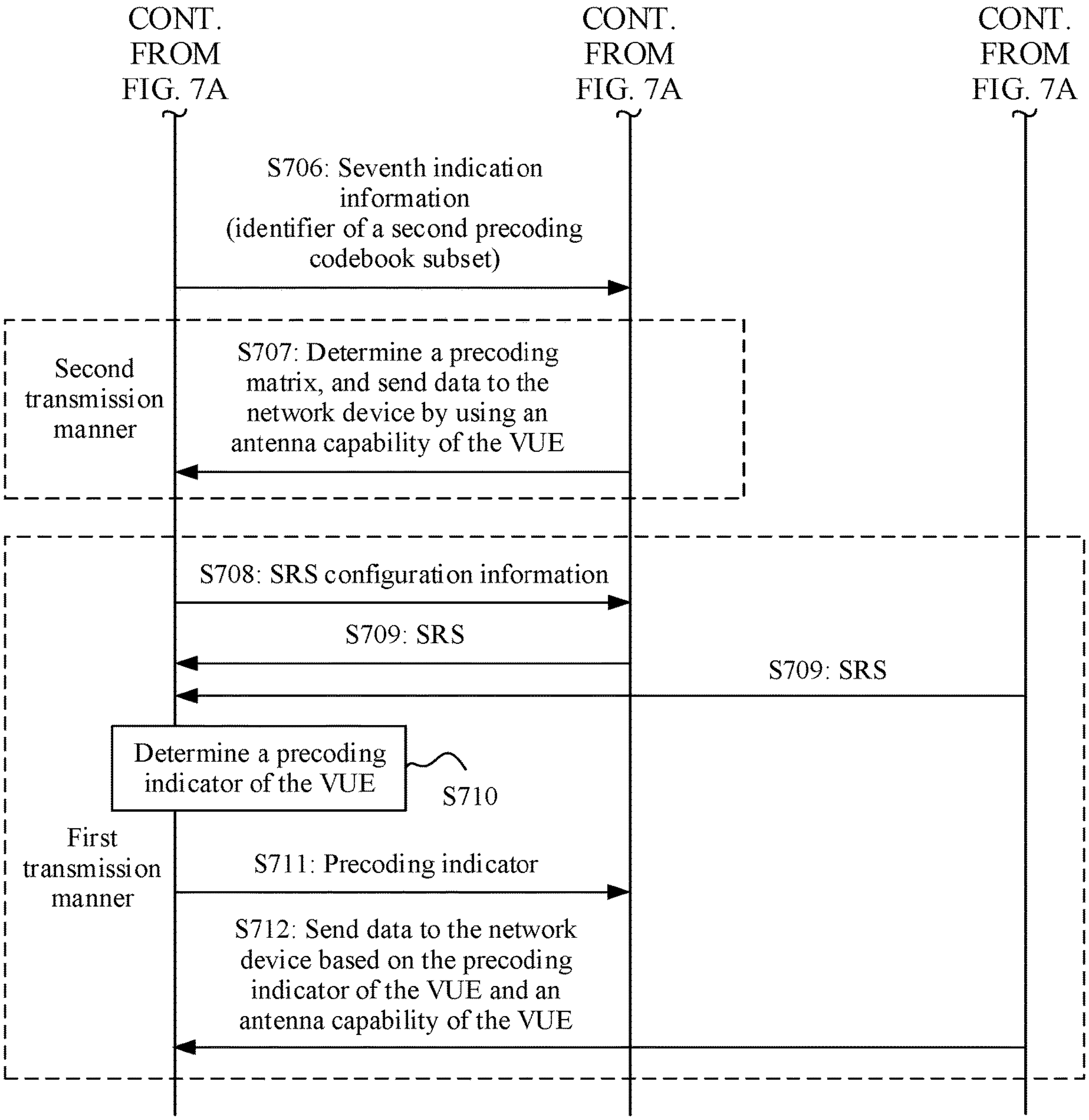

FIG. 7A and FIG. 7B show a process of another uplink data sending method and receiving method according to an embodiment of this application. Being different from FIG. 6A and FIG. 6B, in the embodiment shown in FIG. 7A and FIG. 7B, a network device does not determine a first precoding codebook subset by using an antenna coherence capability of VUE, but determines the first precoding codebook subset based on a precoding codebook subset that can be used by the VUE.

S701: The network device sends first indication information to each of SUE and CUE, and correspondingly, the SUE and the CUE separately receive the first indication information. The first indication information indicates a correspondence between the SUE and at least one CUE.

Specific implementation of S701 is the same as specific implementation of S601. For details, refer to the related content of S501. Details are not described herein again.

Similar to the embodiment shown in FIG. 6A and FIG. 6B, in the embodiment shown in FIG. 7A and FIG. 7B, the network device determines a first precoding codebook subset of the VUE in two manners. In a first determining manner, the SUE determines the first precoding codebook subset of the VUE, and notifies the network device (S702*a* to S704*a* in FIG. 7A). In a second determining manner, the network device determines the first precoding codebook subset of the VUE based on a precoding codebook subset that can be used by the SUE and a precoding codebook subset that can be used by the CUE (S702*b* to S704*b* in FIG. 7A). It should be noted that, in this embodiment of this application, only one of the first determining manner and the second determining manner needs to be performed. To be specific, the steps in the first determining manner may be performed, and the steps in the second determining manner may not be performed. Alternatively, the steps in the second determining manner may be performed, and the steps in the first determining manner may not be performed.

S702*a*: The CUE sends second indication information to the SUE, and correspondingly, the SUE receives the second indication information, where the second indication information indicates the precoding codebook subset that can be used by the CUE.

The precoding codebook subset that can be used by the CUE may be considered as a candidate set of the first precoding codebook subset. The second indication information may be carried in PC5 RRC signaling, SLMAC CE signaling, SCI, or other possible interface signaling. If a candidate precoding codeword set is predefined, for example, a plurality of tables such as Table 2 are predefined, the second indication information may include a codeword index. To be specific, the candidate set of the first precoding codebook subset is indicated by using the codeword index. If a candidate precoding codeword set is not defined, the second indication information may include a set of a plurality of codewords, and the set is used as the candidate set of the first precoding codebook subset.

S703*a*: The SUE determines the first precoding codebook subset based on the precoding codebook subset that can be used by the SUE and the precoding codebook subset that can be used by the CUE.

A specific implementation in which the SUE determines the first precoding codebook subset based on the precoding codebook subset that can be used by the SUE and the precoding codebook subset that can be used by the CUE is not limited in this embodiment of this application.

In a possible implementation, the SUE may determine the first precoding codebook subset based on a defined precoding codeword set, the precoding codebook subset that can be used by the SUE, and the precoding codebook subset that can be used by the CUE. For example, a codeword in the precoding codebook subset of the SUE and an element 0 may be used as a column of codewords in the precoding codebook subset of the VUE, and a codeword in the precoding codebook subset of the CUE and an element 0 may be used as another column of codewords in the precoding codebook subset of the VUE. In other words, a column of codewords in the precoding codebook subset of the VUE include the codeword in the precoding codebook subset of the SUE and the element 0, and another column of codewords in the precoding codebook subset of the VUE include the codeword in the precoding codebook subset of the CUE and the element 0.

For ease of understanding, the following uses an example in which a quantity of antenna ports of the SUE is two, a quantity of antenna ports of the CUE is two, and the SUE and the CUE perform transmission at a single layer to describe how the SUE determines the first precoding codebook subset. It should be understood that a quantity of antenna ports of the VUE is four, and the SUE sends data based on the antenna ports of the VUE, that is, by using four antenna ports, and performs transmission at two layers. It is assumed that a defined precoding codeword set for transmission at two layers using four antenna ports is shown in Table 3. For a precoding codeword set for transmission at a single layer using two antenna ports, refer to Table 7.

VUE to perform transmission at two layers and that is determined by the SUE is {TPMI=6, TPMI=7, TPMI=13} in Table 3. It can be seen from Table 3 that, a non-zero element in a column of codewords corresponding to the TPMI indexes 6 to 13 is a codeword that can be used by the SUE, and a non-zero element in another column of codewords corresponding to the TPMI indexes 6 to 13 is a codeword that can be used by the CUE.

In another example, precoding codebook subsets that can be used by the SUE and the CUE to perform transmission at a single layer based on two antenna ports include some codewords in Table 7. For example, the precoding codebook subset that can be used by the SUE to perform transmission at a single layer based on two antenna ports includes {TMPI=0, TMPI=1, TMPI=2, TMPI=3} in Table 7, and the precoding codebook subset that can be used by the CUE to perform transmission at a single layer based on two antenna ports includes {TMPI=0, TMPI=1, TMPI=4, TMPI=5} in Table 7. Correspondingly, a precoding subset that can be used by the VUE to perform transmission at two layers and that is determined by the SUE is {TPMI=6, TPMI=7,

TABLE 7

Precoding matrix W for transmission at a single layer using two antenna ports

| Transmitted precoding matrix indicator (transmitted precoding matrix indicator, TPMI) index (index) | W<br>Ordered from left to right in increasing order of TPMI index<br>(ordered from left to right in increasing order of TPMI index) | | | | | | | |
|---|---|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | — | — |

A TMPI index corresponding to a precoding codebook subset that can be used by the SUE to perform transmission at a single layer based on two antenna ports may include one or more of {0, 1, 2, 3, 4, 5}. To be specific, the precoding codebook subset that can be used by the SUE to perform transmission at a single layer based on two antenna ports is a codeword set corresponding to some or all of the TPMI indexes 0 to 5. For example, the precoding codebook subset that can be used by the SUE to perform transmission at a single layer based on two antenna ports includes one or more of six codewords in Table 7. Similarly, a precoding codebook subset that can be used by the CUE to perform transmission at a single layer based on two antenna ports is a codeword set corresponding to some or all of the TPMI indexes 0 to 5. For ease of description, the following uses a TPMI to represent the codeword included in the precoding codebook subset. For example, the precoding codebook subset that can be used by the SUE to perform transmission at a single layer based on two antenna ports includes {TMPI=0, TMPI=1, TMPI=2} in Table 7.

In an example, precoding codebook subsets that can be used by the SUE and the CUE to perform transmission at a single layer based on two antenna ports both include all codewords in Table 7. To be specific, the precoding codebook subset that can be used by the SUE to perform transmission at a single layer based on two antenna ports includes {TMPI=0, TMPI=1, TMPI=2, TMPI=3, TMPI=4, TMPI=5} in Table 7, and the precoding codebook subset that can be used by the CUE to perform transmission at a single layer based on two antenna ports includes {TMPI=0, TMPI=1, TMPI=2, TMPI=3, TMPI=4, TMPI=5} in Table 7. Correspondingly, a precoding subset that can be used by the VUE to perform transmission at two layers and that is determined by the SUE is {TPMI=6, TPMI=7, TPMI=10, TPMI=11} in Table 3. For example, the SUE determines, based on the codeword TMPI=2 that is supported by the SUE, namely, $$\frac{1}{\sqrt{2}}\begin{bmatrix}1\\1\end{bmatrix},$$

and the codeword that is supported by the CUE, namely, $$\frac{1}{\sqrt{2}}\begin{bmatrix}1\\j\end{bmatrix},$$

in Table 7, that a codeword that can be used by the VUE to perform transmission at two layers is TPMI=7 in Table 3.

In still another example, precoding codebook subsets that can be used by the SUE and the CUE to perform transmission at a single layer based on two antenna ports include a non-coherent codeword in Table 7. To be specific, the precoding codebook subset that can be used by the SUE to perform transmission at a single layer based on two antenna ports includes {TMPI=0, TMPI=1} in Table 7, and the precoding codebook subset that can be used by the CUE to perform transmission at a single layer based on two antenna ports includes {TMPI=0, TMPI=1} in Table 7. Correspondingly, a precoding subset that can be used by the VUE to perform transmission at two layers and that is determined by the SUE is {TPMI=0, TPMI=1, . . . TPMI=5} in Table 2.

In another possible implementation, the SUE may determine, based on the codeword included in the precoding codebook subset that can be used by the SUE and a mapping relationship between the antenna port of the SUE and the antenna port of the VUE, a part of elements in the codeword in the precoding codebook subset that can be used by the VUE. The SUE may further determine, based on the codeword included in the precoding codebook subset that can be used by the CUE and a mapping relationship between the antenna port of the CUE and the antenna port of the VUE, another part of elements in the codeword in the precoding codebook subset that can be used by the VUE.

For example, it is assumed that the codeword in the precoding codebook subset that can be used by the SUE is a fully coherent codeword in Table 7, and is denoted as {A2, A3, A4, A5}, and the codeword in the precoding codebook subset that can be used by the CUE is a fully coherent codeword in Table 7, and is denoted as {B2, B3, B4, B5}. In this case, $$A_2 = \frac{1}{\sqrt{2}}\begin{bmatrix}1\\1\end{bmatrix},\ A_3 = \frac{1}{\sqrt{2}}\begin{bmatrix}1\\-1\end{bmatrix},\ A_4 = \frac{1}{\sqrt{2}}\begin{bmatrix}1\\j\end{bmatrix},\text{ and } A_5 = \frac{1}{\sqrt{2}}\begin{bmatrix}1\\-j\end{bmatrix};\text{ and}$$

$$B_2 = \frac{1}{\sqrt{2}}\begin{bmatrix}1\\1\end{bmatrix},\ B_3 = \frac{1}{\sqrt{2}}\begin{bmatrix}1\\-1\end{bmatrix},\ B_4 = \frac{1}{\sqrt{2}}\begin{bmatrix}1\\j\end{bmatrix},\text{ and}$$

$$B_5 = \frac{1}{\sqrt{2}}\begin{bmatrix}1\\-j\end{bmatrix}.$$

It is assumed that antenna port numbers of the SUE are 1 and 3, and antenna port numbers of the CUE are 2 and 4. In this case, a matrix M corresponding to the SUE is $$\begin{bmatrix}1&0\\0&0\\0&1\\0&0\end{bmatrix},$$

and a matrix N corresponding to the CUE is $$\begin{bmatrix}0&0\\1&0\\0&0\\0&1\end{bmatrix}.$$

It should be understood that, if antenna port numbers of the SUE are 1 and 2, and antenna port numbers of the CUE are 3 and 4, a matrix M corresponding to the SUE is $$\begin{bmatrix}1&0\\0&1\\0&0\\0&0\end{bmatrix},$$

and a matrix N corresponding to the CUE is $$\begin{bmatrix}0&0\\0&0\\1&0\\0&1\end{bmatrix}.$$

The following uses an example in which the M is $$\begin{bmatrix}1&0\\0&0\\0&1\\0&0\end{bmatrix},$$

and the N is $$\begin{bmatrix}0&0\\1&0\\0&0\\0&1\end{bmatrix}.$$

The SUE may determine, based on the M and the codeword in the precoding codebook subset that can be used by the SUE, a part of elements in the codeword in the precoding codebook subset that can be used by the VUE. For example, the part of elements include {C1, C2, C3, C4}. The SUE may determine, based on the N and the codeword in the precoding codebook subset that can be used by the CUE, another part of elements in the codeword in the precoding codebook subset that can be used by the VUE. For example, the part of elements include {D1, D2, D3, D4}.

$$C_1 = M\times A_2 = \begin{bmatrix}1\\0\\1\\0\end{bmatrix},\ C_2 = M\times A_3 = \begin{bmatrix}1\\0\\-1\\0\end{bmatrix},$$

$$C_3 = M\times A_4 = \begin{bmatrix}1\\0\\j\\0\end{bmatrix},\text{ and } C_4 = M\times A_5 = \begin{bmatrix}1\\0\\-j\\0\end{bmatrix}.$$

$$D_1 = N\times B_2 = \begin{bmatrix}0\\1\\0\\1\end{bmatrix},\ D_2 = N\times B_3 = \begin{bmatrix}0\\1\\0\\-1\end{bmatrix},$$

$$D_3 = N\times B_4 = \begin{bmatrix}0\\1\\0\\j\end{bmatrix},\text{ and } D_4 = N\times B_5 = \begin{bmatrix}0\\1\\0\\-j\end{bmatrix}.$$

The codeword in the precoding codebook subset that can be used by the VUE includes any element in {C1, C2, C3, C4} and any element in {D1, D2, D3, D4}, that is, there are 16 codewords. For example, the codeword in the precoding codebook subset that can be used by the VUE may include $$\frac{1}{2}\begin{bmatrix}1&0\\0&1\\j&0\\0&-1\end{bmatrix}$$

formed by C3 and D2, may include $$\frac{1}{2}\begin{bmatrix}1&0\\0&1\\1&0\\0&j\end{bmatrix}$$

formed by C1 and D3, or may include $$\frac{1}{2}\begin{bmatrix}1 & 0\\0 & 1\\-1 & 0\\0 & -1\end{bmatrix}$$

formed by C2 and D2. Because Table 3 does not include $$\frac{1}{2}\begin{bmatrix}1 & 0\\0 & 1\\-1 & 0\\0 & -1\end{bmatrix},$$

it can be learned that a new codeword may be designed in this implementation, and is not limited by Table 3, namely, a predefined precoding codeword set.

S704*a*: The SUE sends third indication information to the network device, and correspondingly, the network device receives the third indication information, where the third indication information indicates the first precoding codebook subset.

S702*b*: The SUE sends fifth indication information to the network device, and correspondingly, the network device receives the fifth indication information, where the fifth indication information indicates the precoding codebook subset that can be used by the SUE.

S703*b*: The CUE sends sixth indication information to the network device, and correspondingly, the network device receives the sixth indication information, where the sixth indication information indicates the precoding codebook subset that can be used by the CUE.

S704*b*: The network device determines the first precoding codebook subset based on the precoding codebook subset that can be used by the SUE and the precoding codebook subset that can be used by the CUE.

S706: The network device sends seventh indication information to the SUE, and correspondingly, the SUE receives the seventh indication information, where the seventh indication information indicates a second precoding codebook subset.

After determining the first precoding codebook subset, the network device may determine a precoding codebook subset that is applicable to scheduling the VUE. The precoding codebook subset may be the first precoding codebook subset, or may be another possible precoding codebook subset. For ease of differentiation, the precoding codebook subset that is applicable to scheduling the VUE is referred to as the second precoding codebook subset below.

The network device may determine the second precoding codebook subset based on the first precoding codebook subset indicated by the SUE in S704. The second precoding codebook subset may be the first precoding codebook subset indicated by the SUE, or may be a subset of the first precoding codebook subset indicated by the SUE. For example, the precoding subset that can be used by the VUE and that is determined by the SUE, that is, the first precoding codebook subset, is {TPMI=6, TPMI=7, TPMI=13} in Table 3. If the network device measures overall system performance, and considers that all codewords in the first precoding codebook subset are applicable to scheduling the VUE, the second precoding codebook subset is the first precoding codebook subset. If the network device measures overall system performance, and considers that a codeword in {TPMI=6, TPMI=10} in Table 3 is more applicable to scheduling the VUE, the second precoding codebook subset is {TPMI=6, TPMI=10}.

The seventh indication information includes a relative index of the second precoding codebook subset in the first precoding codebook subset. For example, if the second precoding codebook subset is {TPMI=6, TPMI=10}, an index of TPMI=6 in {TPMI=6, TPMI=7, TPMI=13} is 0, and an index of TPMI=10 in {TPMI=6, TPMI=7, TPMI=13} is 4, the seventh indication information includes two index values: 0 and 4.

Specific implementation of S706 is the same as specific implementation of S609. For details, refer to the related content of S609. Details are not described herein again. In this embodiment of this application, after learning the second precoding codebook subset, the SUE may send the data based on a codebook transmission manner (for example, a first transmission manner in FIG. 7B), or may send the data based on a non-codebook transmission manner (for example, a second transmission manner in FIG. 7B).

S707: The SUE determines a precoding matrix, and sends the data to the network device by using an antenna capability of the VUE.

Specific implementation of S707 is the same as specific implementation of S610. For details, refer to the related content of S610. Details are not described herein again.

S708: The network device sends sounding reference signal SRS configuration information of the VUE to the SUE, and correspondingly, the SUE receives the configuration information.

S709: The SUE and the CUE send an SRS to the network device.

S710: The network device determines a precoding indicator of the VUE.

S711: The network device sends the precoding indicator of the VUE to the SUE.

S712: The SUE sends the data to the network device based on the precoding indicator of the VUE and the antenna capability of the VUE.

Specific implementation of S708 to S712 is the same as specific implementation of S611 to S615. For details, refer to the related content of S611 to S615. Details are not described herein again.

In the solutions provided in embodiments of this application, a first terminal device may aggregate antenna capabilities of another one or more second terminal devices, so that the first terminal device can use a larger antenna capability. The first terminal device sends uplink data by using the larger antenna capability. This can increase a transmission rate of the uplink data sent by the first terminal device.

The foregoing embodiments provided in this application separately describe the methods provided in embodiments of this application from a perspective of interaction between the terminal device and the network device. The steps performed by the network device may also be separately implemented by different communication apparatuses. For example, a first apparatus is configured to determine an antenna coherence capability of VUE, and a second apparatus is configured to receive data from SUE by using the antenna coherence capability of the VUE. In other words, the first apparatus and the second apparatus jointly complete the steps performed by the network device in embodiments of this application. A specific division manner is not limited in this application. When a network architecture includes one or more distributed units (distributed units, DUs), one or more central units (central units, CUs), and one or more radio frequency units (RUs), the steps performed by the network device may be separately implemented by the DU, the CU, and the RU. To implement functions in the foregoing methods provided in embodiments of this application, the terminal device and the network device each may include a hardware structure and/or a software module, and implement the foregoing functions in a form of the hardware structure, the software module, or a combination of the hardware structure and the software module. Whether a specific function in the foregoing functions is performed by the hardware structure, the software module, or the combination of the hardware structure and the software module depends on particular applications and design constraints of the technical solutions.

Based on a same concept as that of the method embodiments, an embodiment of this application provides a communication apparatus. The following describes, with reference to the accompanying drawings, a communication apparatus for implementing the foregoing methods in embodiments of this application.

Figure 8:
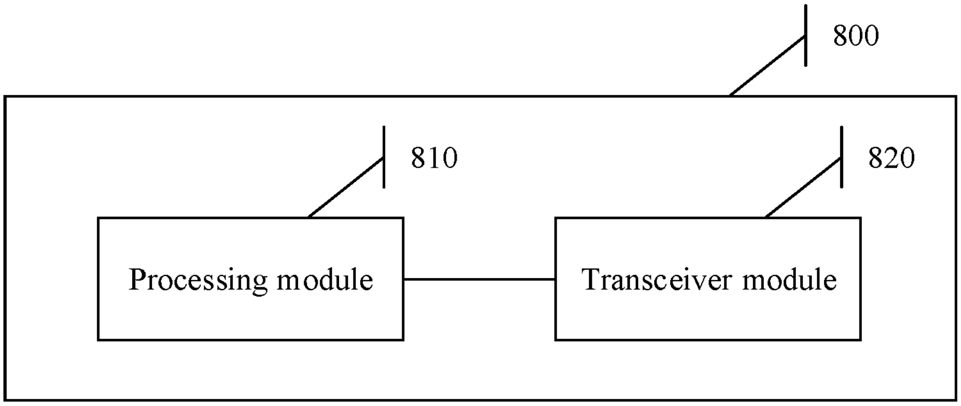
FIG. 8 is a schematic diagram of a structure of a communication apparatus according to an embodiment of this application.

FIG. 8 is a schematic block diagram of a communication apparatus 800 according to an embodiment of this application. The communication apparatus 800 may include a processing module 810 and a transceiver module 820. Optionally, the communication apparatus 800 may further include a storage unit. The storage unit may be configured to store instructions (code or a program) and/or data. The processing module 810 and the transceiver module 820 may be coupled to the storage unit. For example, the processing module 810 may read the instructions (the code or the program) and/or the data in the storage unit, to implement a corresponding method. The foregoing units may be independently disposed, or may be partial or completely integrated.

In some possible implementations, the communication apparatus 800 can correspondingly implement behavior and functions of the terminal device in the foregoing method embodiments, for example, implement the method performed by the SUE in the embodiment of FIG. 6A and FIG. 6B or FIG. 7A and FIG. 7B. The communication apparatus 800 may be a terminal device, a component (for example, a chip or a circuit) used in the terminal device, a chip or a chip set in the terminal device, or a part that is of a chip and that is configured to perform a related method function. The transceiver module 820 may be configured to perform all receiving or sending operations performed by the SUE in the embodiment shown in FIG. 6A and FIG. 6B or FIG. 7A and FIG. 7B. For example, the transceiver module 820 may be configured to perform S601, S602, S604, S606, S607, S609, and S610 in the embodiment shown in FIG. 6A and FIG. 6B, and/or configured to support another process of the technology described in this specification. Alternatively, the transceiver module 820 may be configured to perform S601, S602, S604, S606, S607, S609, S611, S612, and S614 in the embodiment shown in FIG. 6A and FIG. 6B, and/or configured to support another process of the technology described in this specification. For another example, the transceiver module 820 may be configured to perform S701, S702*a*, S704*a*, S705*a*, S706, and S707 (or S708, S709, S711, and S712) in the embodiment shown in FIG. 7A and FIG. 7B, and/or configured to support another process of the technology described in this specification. Alternatively, the transceiver module 820 may be configured to perform S701, S702*b*, S703*b*, S704*b*, S706, and S707 (or S708, S709, S711, and S712) in the embodiment shown in FIG. 7A and FIG. 7B, and/or configured to support another process of the technology described in this specification. The processing module 810 is configured to perform all operations other than the receiving or sending operations performed by the SUE in the embodiment shown in FIG. 6A and FIG. 6B or FIG. 7A and FIG. 7B. For example, the processing module 810 is configured to perform S605 in the embodiment shown in FIG. 6A and FIG. 6B, and/or configured to support another process of the technology described in this specification. For another example, the processing module 810 is configured to perform S703*a* in the embodiment shown in FIG. 7A and FIG. 7B, and/or configured to support another process of the technology described in this specification.

In some embodiments, the transceiver module 820 is configured to send first indication information to a network device. The first indication information is used to determine a first precoding codebook subset to be used by VUE. Antennas of the VUE include an antenna of the communication apparatus 800 and antennas of one or more second terminal devices. The transceiver module 820 is further configured to receive configuration information from the network device. The configuration information indicates the first precoding codebook subset. The transceiver module 820 is further configured to send data to the network device based on the first precoding codebook subset.

In an optional implementation, the first indication information indicates an antenna coherence capability of the virtual terminal device, and the antenna coherence capability includes fully coherent, partial coherent, or non-coherent. Alternatively, the first indication information indicates a candidate set of the first precoding codebook subset.

In an optional implementation, a quantity of antenna ports corresponding to the first precoding codebook subset is equal to a quantity of antenna ports of the VUE.

In an optional implementation, the transceiver module 820 is further configured to receive second indication information from the network device. The second indication information indicates a correspondence between a first terminal device and at least one second terminal device. The one or more second terminal devices belong to the at least one second terminal device.

In an optional implementation, the transceiver module 820 is configured to send the first indication information to the network device when a preset condition is met. The preset condition includes one or more of the following conditions: The transceiver module 820 receives the second indication information; a data rate of uplink data of the communication apparatus 800 greater than or equal to a first preset threshold; or a quantity of antennas of the communication apparatus 800 is less than or equal to a second preset threshold.

In an optional implementation, the transceiver module 820 is further configured to receive third indication information from each of the one or more second terminal devices. The third indication information indicates an antenna coherence capability of the corresponding second terminal device.

The processing module 810 is configured to determine the antenna coherence capability of the VUE based on an antenna coherence capability of the communication apparatus 800 and the antenna coherence capability of the second terminal device.

In an optional implementation, the transceiver module 820 is further configured to send the first indication information to the one or more second terminal devices.

In some possible implementations, the communication apparatus 800 can correspondingly implement behavior and functions of the network device in the foregoing method embodiments, for example, implement the method performed by the network device in the embodiment of FIG. 6A and FIG. 6B or FIG. 7A and FIG. 7B. For example, the communication apparatus 800 may be a network device, a component (for example, a chip or a circuit) used in the network device, a chip or a chip set in the network device, or a part that is of a chip and that is configured to perform a related method function. The transceiver module 820 may be configured to perform all receiving or sending operations performed by the network device in the embodiment shown in FIG. 6A and FIG. 6B or FIG. 7A and FIG. 7B. For example, the transceiver module 820 may be configured to perform S601, S602, S603, S606, S609, and S610 (or S611, S612, S614, and S615) in the embodiment shown in FIG. 6A and FIG. 6B, and/or configured to support another process of the technology described in this specification. For another example, the transceiver module 820 may be configured to perform S701, S704*a*, S706, and S707 (S708, S709, S711, and S712) in the embodiment shown in FIG. 7A and FIG. 7B, and/or configured to support another process of the technology described in this specification. Alternatively, the transceiver module 820 may be configured to perform S701, S702*b*, S703*b*, S706, and S707 (S708, S709, S711, and S712) in the embodiment shown in FIG. 7A and FIG. 7B, and/or configured to support another process of the technology described in this specification. The processing module 810 is configured to perform all operations other than the receiving or sending operations performed by a base station in the embodiment shown in FIG. 6A and FIG. 6B or FIG. 7A and FIG. 7B, and/or configured to support another process of the technology described in this specification. For example, the processing module 810 is configured to perform S608 and S613 in the embodiment shown in FIG. 6A and FIG. 6B, and/or configured to support another process of the technology described in this specification. For another example, the processing module 810 is configured to perform S704*b* and S710 in the embodiment shown in FIG. 7A and FIG. 7B, and/or configured to support another process of the technology described in this specification.

In some embodiments, the processing module 810 is configured to determine the first precoding codebook subset to be used by the VUE. The antennas of the VUE include the antenna of the first terminal device and the antennas of the one or more second terminal devices. The transceiver module 820 is configured to send the first indication information to the first terminal device, and receive uplink data from the first terminal device. The first indication information indicates the first precoding codebook subset. The uplink data is sent based on the first precoding codebook subset.

In an optional implementation, the first indication information indicates the antenna coherence capability of the virtual terminal device, and the antenna coherence capability includes fully coherent, partial coherent, or non-coherent. Alternatively, the first indication information indicates the candidate set of the first precoding codebook subset.

In an optional implementation, the quantity of antenna ports corresponding to the first precoding codebook subset is equal to the quantity of antenna ports of the virtual terminal device.

In an optional implementation, the transceiver module 820 is further configured to send the second indication information to the first terminal device. The second indication information indicates the correspondence between the first terminal device and the at least one second terminal device. The one or more second terminal devices belong to the at least one second terminal device.

In an optional implementation, the transceiver module 820 is configured to receive third indication information from the first terminal device. The third indication information indicates the first precoding codebook subset.

In an optional implementation, the transceiver module 820 is further configured to receive fourth indication information from the first terminal device, and receive fifth indication information from each of the one or more second terminal devices. The fourth indication information indicates a first candidate set of the first precoding codebook subset. The fifth indication information indicates a second candidate set that corresponds to the second terminal device and that is of the first precoding codebook subset. The processing module 810 is configured to determine the first precoding codebook subset based on the first candidate set and the second candidate set.

In an optional implementation, the processing module 810 is configured to: determine the antenna coherence capability of the VUE, and determine the first precoding codebook subset based on the antenna coherence capability of the VUE. The antenna coherence capability includes fully coherent, partial coherent, or non-coherent.

In an optional implementation, the transceiver module 820 is configured to receive sixth indication information from the first terminal device. The sixth indication information indicates the antenna coherence capability of the VUE.

In an optional implementation, the transceiver module 820 is further configured to receive seventh indication information from the first terminal device, and receive eighth indication information from each of the one or more second terminal devices. The seventh indication information indicates an antenna coherence capability of the first terminal device. The eighth indication information indicates an antenna coherence capability of the corresponding second terminal device. The processing module 810 is configured to determine the antenna coherence capability of the VUE based on the antenna coherence capability of the first terminal device and the antenna coherence capabilities of the one or more second terminal devices.

In an optional implementation, the antenna of the first terminal device is not coherent with the antennas of the one or more second terminal devices.

It should be understood that, in this embodiment of this application, the processing module 810 may be implemented by a processor or a processor-related circuit component, and the transceiver module 820 may be implemented by a transceiver, a transceiver-related circuit component, or a communication interface.

Figure 9:
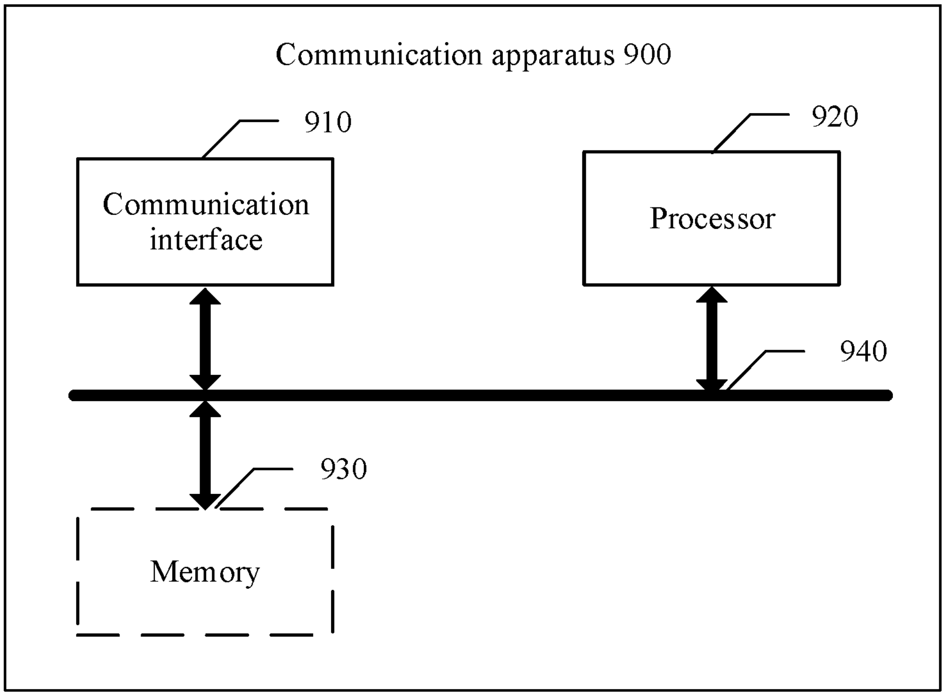
FIG. 9 is a schematic diagram of another structure of a communication apparatus according to an embodiment of this application.

FIG. 9 shows a communication apparatus 900 according to an embodiment of this application. The communication apparatus 900 may be a terminal device, and may implement functions of the terminal device in the method provided in embodiments of this application. Alternatively, the communication apparatus 900 may be a network device, and may implement functions of the network device in the method provided in embodiments of this application. Alternatively, the communication apparatus 900 may be an apparatus that may support a terminal device in implementing corresponding functions in the methods provided in embodiments of this application, or may be an apparatus that may support a network device in implementing corresponding functions in the methods provided in embodiments of this application. The communication apparatus 900 may be a chip system. In this embodiment of this application, the chip system may include a chip, or may include a chip and another discrete component.

In terms of hardware implementation, the transceiver module 820 may be a transceiver, and the transceiver is integrated into the communication apparatus 900 to form a communication interface 910.

The communication apparatus 900 includes at least one processor 920, configured to implement or support the communication apparatus 900 in implementing the functions of the network device (base station) or the terminal device in the methods provided in embodiments of this application. For details, refer to the detailed descriptions in the method example. Details are not described herein again.

The communication apparatus 900 may further include at least one memory 930, configured to store program instructions and/or data. The memory 930 is coupled to the processor 920. The coupling in this embodiment of this application is an indirect coupling or a communication connection between apparatuses, units, or modules in an electrical form, a mechanical form, or another form, and is used for information exchange between the apparatuses, the units, or the modules. The processor 920 may operate in collaboration with the memory 930. The processor 920 may execute the program instructions and/or the data stored in the memory 930, to enable the communication apparatus 900 to implement a corresponding method. At least one of the at least one memory may be included in the processor. It should be noted that the memory 930 is not mandatory, and therefore is shown by using a dashed line in FIG. 9.

The communication apparatus 900 may further include a communication interface 910, configured to communicate with another device through a transmission medium, so that an apparatus in the communication apparatus 900 can communicate with the another device. For example, when the communication apparatus is a terminal, the another device is a network device. Alternatively, when the communication apparatus is a network device, the another device is a terminal. The processor 920 may send and receive data using the communication interface 910. The communication interface 910 may be a transceiver.

This embodiment of this application does not limit a specific connection medium between the communication interface 910, the processor 920, and the memory 930. In this embodiment of this application, in FIG. 9, the memory 930, the processor 920, and the communication interface 910 are connected through a bus 940, and the bus is represented using a bold line in FIG. 9. A connection manner between other components is only an example for description, and imposes no limitation. The bus may be classified into an address bus, a data bus, a control bus, and the like. For ease of representation, only one thick line is used to represent the bus in FIG. 9, but this does not mean that there is only one bus or only one type of bus.

In this embodiment of this application, the processor 920 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor or any conventional processor or the like. The steps of the methods disclosed with reference to embodiments of this application may be directly implemented by a hardware processor, or may be implemented by using a combination of hardware in a processor and a software module.

In this embodiment of this application, the memory 930 may be a non-volatile memory such as a hard disk drive (hard disk drive, HDD) or a solid-state drive (solid-state drive, SSD), or may be a volatile memory (volatile memory) such as a random access memory (random access memory, RAM). The memory is any other medium that can be configured to carry or store expected program code in a form of an instruction or a data structure and that can be accessed by a computer, but is not limited thereto. The memory in this embodiment of this application may alternatively be a circuit or any other apparatus that can implement a storage function, and is configured to store program instructions and/or data.

It should be noted that the communication apparatus in the foregoing embodiments may be a terminal, a circuit, a chip used in the terminal, or another combined device, component, or the like that has a terminal function. When the communication apparatus is the terminal, the transceiver module may be a transceiver, and may include an antenna, a radio frequency circuit, and the like. The processing module may be a processor, for example, a central processing module (central processing unit, CPU). When the communication apparatus is a component having the terminal function, the transceiver module may be a radio frequency unit, and the processing module may be a processor. When the communication apparatus is a chip system, the transceiver module may be an input/output interface of the chip system, and the processing module may be a processor of the chip system.

Figure 10:
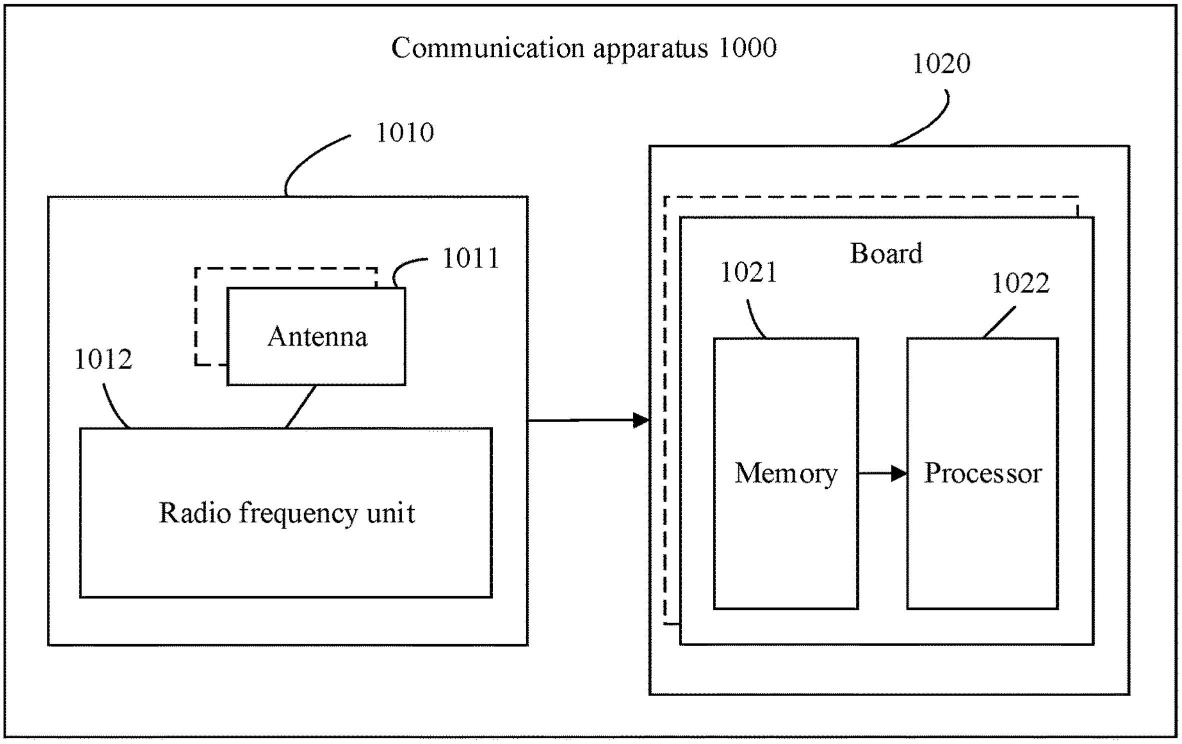
FIG. 10 is a schematic diagram of a structure of a communication apparatus according to an embodiment of this application.

FIG. 10 is a schematic diagram of a simplified structure of a communication apparatus. For ease of understanding and illustration, FIG. 10 uses an example in which the communication apparatus is a base station. The base station may be used in the system shown in FIG. 1, may be the network device in FIG. 1, and performs functions of the network device in the foregoing method embodiments.

The communication apparatus 1000 may include a transceiver 1010, a memory 1021, and a processor 1022. The transceiver 1010 may be used by the communication apparatus for communication, for example, configured to send or receive first indication information or capability information. The memory 1021 is coupled to the processor 1022, and may be configured to store a program and data that are necessary for implementing functions by the communication apparatus 1000. The processor 1022 is configured to support the communication apparatus 1000 in performing corresponding functions in the foregoing methods. The functions may be implemented by invoking the program stored in the memory 1021.

Specifically, the transceiver 1010 may be a wireless transceiver, and may be configured to support the communication apparatus 1000 in receiving and sending signaling and/or data through a radio air interface. The transceiver 1010 may also be referred to as a transceiver unit or a communication unit. The transceiver 1010 may include one or more radio frequency units 1012 and one or more antennas 1011. The radio frequency unit, for example, a remote radio unit (remote radio unit, RRU) or an active antenna unit (active antenna unit, AAU), may be configured to transmit a radio frequency signal and perform conversion between a radio frequency signal and a baseband signal. The one or more antennas may be configured to radiate and receive a radio frequency signal. Optionally, the transceiver 1010 may include only the foregoing radio frequency unit. In this case, the communication apparatus 1000 may include the transceiver 1010, the memory 1021, the processor 1022, and the antenna 1011.

The memory 1021 and the processor 1022 may be integrated, or may be independent of each other. As shown in FIG. 10, the memory 1021 and the processor 1022 may be integrated into a control unit 1020 of the communication apparatus 1000. For example, the control unit 1020 may include a baseband unit (baseband unit, BBU) of an LTE base station, and the baseband unit may also be referred to as a digital unit (digital unit, DU). Alternatively, the control unit 1020 may include a distributed unit (distributed unit, DU) and/or a central unit (central unit, CU) in a base station in 5G and future radio access technologies. The control unit 1020 may include one or more antenna panels. A plurality of antenna panels may jointly support a radio access network (for example, an LTE network) of a single access standard. Alternatively, a plurality of antenna panels may separately support radio access networks (for example, an LTE network, a 5G network, or another network) of different access standards. The memory 1021 and the processor 1022 may serve one or more antenna panels. In other words, the memory 1021 and the processor 1022 may be disposed on each antenna panel. Alternatively, the plurality of antenna panels may share a same memory 1021 and a same processor 1022. In addition, a necessary circuit may be disposed on each antenna panel. For example, the circuit may be configured to implement coupling between the memory 1021 and the processor 1022. The transceiver 1010, the processor 1022, and the memory 1021 may be connected to each other through a bus (bus) structure and/or another connection medium.

Based on the structure shown in FIG. 10, when the communication apparatus 1000 needs to send data, the processor 1022 may perform baseband processing on the to-be-sent data and output a baseband signal to the radio frequency unit, and the radio frequency unit performs radio frequency processing on the baseband signal and sends a radio frequency signal in an electromagnetic wave form by using the antenna. When data is sent to the communication apparatus 1000, the radio frequency unit receives a radio frequency signal by using the antenna, converts the radio frequency signal into a baseband signal, and outputs the baseband signal to the processor 1022. The processor 1022 converts the baseband signal into data, and processes the data.

Based on the structure shown in FIG. 10, the transceiver 1010 may be configured to perform the foregoing steps performed by the transceiver module 820; and/or, the processor 1022 may be configured to invoke instructions in the memory 1021, to perform the foregoing steps performed by the processing module 810.

Figure 11:
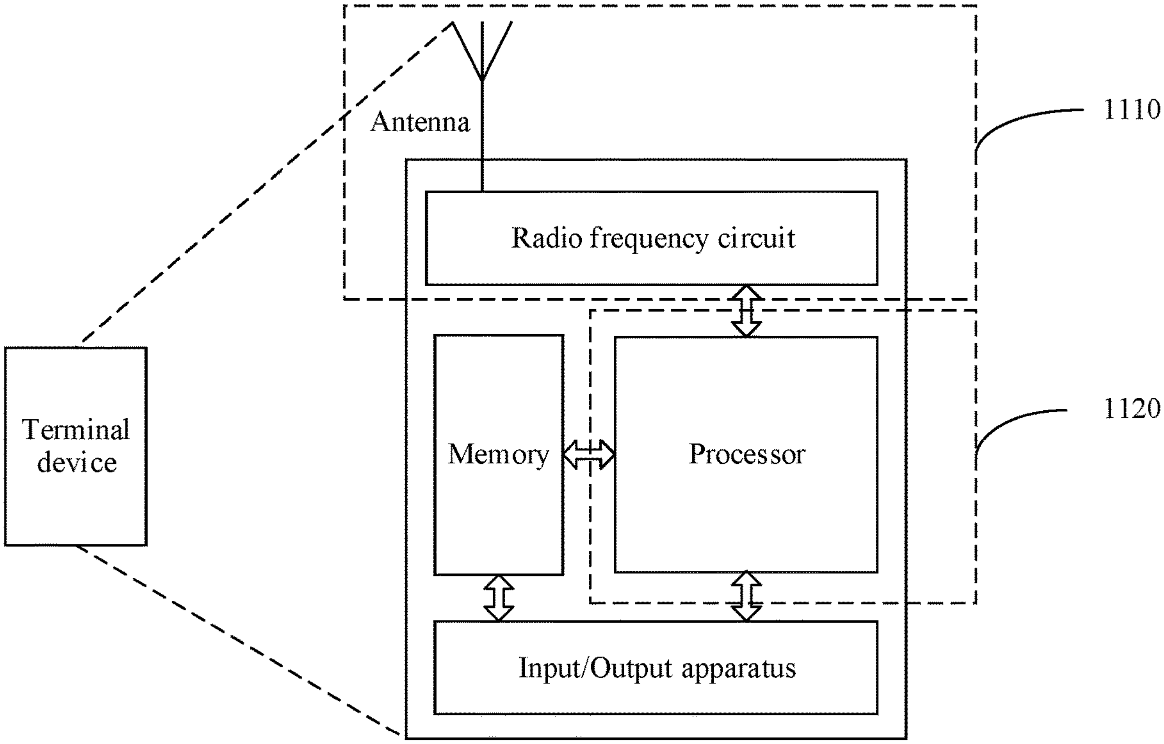
FIG. 11 is a schematic diagram of a structure of another communication apparatus according to an embodiment of this application.

FIG. 11 is a schematic diagram of a simplified structure of a terminal device. For ease of understanding and illustration, FIG. 11 uses an example in which the terminal device is a mobile phone. As shown in FIG. 11, the terminal device includes a processor, a memory, a radio frequency circuit, an antenna, and an input/output apparatus. The processor is mainly configured to process a communication protocol and communication data, control an on-board unit, execute a software program, process data of the software program, and so on. The memory is configured to store the software program and the data. A radio frequency circuit is mainly configured to perform conversion between a baseband signal and a radio frequency signal, and process the radio frequency signal. The antenna is mainly configured to receive and send the radio frequency signal in a form of an electromagnetic wave. The input/output apparatus, such as a touchscreen, a display, or a keyboard, is mainly configured to receive data input by a user and output data to the user. It should be noted that some types of devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in an electromagnetic wave form through the antenna. When data is sent to the device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 11 shows only one memory and one processor. In an actual device product, there may be one or more processors and one or more memories. The memory may also be referred to as a storage medium, a storage device, or the like. The memory may be disposed independently of the processor, or may be integrated with the processor. This is not limited in this embodiment of this application.

In this embodiment of this application, the antenna and the radio frequency circuit that have receiving and sending functions may be considered as a transceiver unit of the apparatus, and the processor having a processing function may be considered as a processing unit of the apparatus. As shown in FIG. 11, the apparatus includes a transceiver unit 1110 and a processing unit 1120. The transceiver unit 1110 may also be referred to as a transceiver, a transceiver machine, a transceiver apparatus, or the like. The processing unit 1120 may also be referred to as a processor, a processing board, a processing module, a processing apparatus, or the like. Optionally, a component that is in the transceiver unit 1110 and that is configured to implement a receiving function may be considered as a receiving unit, and a component that is in the transceiver unit 1110 and that is configured to implement a sending function may be considered as a sending unit. That is, the transceiver unit 1110 includes the receiving unit and the sending unit. The transceiver unit 1110 sometimes may also be referred to as a transceiver machine, a transceiver, a transceiver circuit, or the like. The receiving unit may also be sometimes referred to as a receiver, a receiver machine, a receiver circuit, or the like. The sending unit sometimes may also be referred to as a transmitter, a transmitter machine, a transmitter circuit, or the like.

It should be understood that the transceiver unit 1110 is configured to perform a sending operation and a receiving operation on the terminal device side in the foregoing method embodiments, and the processing unit 1120 is configured to perform another operation other than the sending or receiving operations on the SUE in the foregoing method embodiments.

For example, in an implementation, the transceiver unit 1110 may be configured to perform S601, S602, S604, S606, S607, S609, and S610 in the embodiment shown in FIG. 6A and FIG. 6B, and/or configured to support another process of the technology described in this specification. In another implementation, the transceiver unit 1110 may be configured to perform S601, S602, S604, S606, SS07, S609, S611, S612 and S614 in the embodiment shown in FIG. 6A and FIG. 6B, and/or configured to support another process of the technology described in this specification. The processing unit 1120 may be configured to perform S605 in the embodiment shown in FIG. 6A and FIG. 6B, and/or configured to support another process of the technology described in this specification.

For another example, in an implementation, the transceiver unit 1110 may be configured to perform S701, **S702*a*, S704*a*, S705*a*, S706, and S707 (or S708, S709, S711, and S712) in the embodiment shown in FIG. 7A and FIG. 7B, and/or configured to support another process of the technology described in this specification. In another implementation, the transceiver unit 1110 may be configured to perform S701, S702***b*, S703*b*, S704*b*, S706, and S707 (or S708, S709, S711, and S712) in the embodiment shown in FIG. 7A and FIG. 7B, and/or configured to support another process of the technology described in this specification. The processing unit 1120 may be configured to perform S703*a* in the embodiment shown in FIG. 7A and FIG. 7B, and/or configured to support another process of the technology described in this specification.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

An embodiment of this application further provides a communication system. Specifically, the communication system includes a network device and a plurality of terminal device, or may include more network devices and more terminal devices. For example, the communication system includes a network device and a terminal device that are configured to implement related functions in FIG. 6A and FIG. 6B or FIG. 7A and FIG. 7B, for example, the SUE.

The network device is configured to implement functions related to the network part in FIG. 6A and FIG. 6B or FIG. 7A and FIG. 7B. The terminal device is configured to implement functions related to the terminal device in FIG. 6A and FIG. 6B or FIG. 7A and FIG. 7B, for example, the SUE. For details, refer to the related descriptions in the foregoing method embodiments. Details are not described herein again.

An embodiment of this application further provides a computer-readable storage medium, including instructions. When the instructions are run on a computer, the computer is enabled to perform the method performed by the network device in FIG. 6A and FIG. 6B or FIG. 7A and FIG. 7B. Alternatively, when the instructions are run on a computer, the computer is enabled to perform the method performed by the terminal device, for example, the SUE, in FIG. 6A and FIG. 6B or FIG. 7A and FIG. 7B.

An embodiment of this application further provides a computer program product, including instructions. When the instructions are run on a computer, the computer is enabled to perform the method performed by the network device in FIG. 6A and FIG. 6B or FIG. 7A and FIG. 7B. Alternatively, when the instructions are run on a computer, the computer is enabled to perform the method performed by the terminal device, for example, the SUE, in FIG. 6A and FIG. 6B or FIG. 7A and FIG. 7B.

An embodiment of this application provides a chip system. The chip system includes a processor, and may further include a memory, to implement functions of the network device or the terminal device, for example, the SUE, in the foregoing methods, or implement functions of the network device and the terminal in the foregoing methods. The chip system may include a chip, or may include a chip and another discrete component.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with illustrative logical blocks (illustrative logical blocks) described in embodiments disclosed in this specification and steps (steps), this application may be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the foregoing apparatus embodiments are only examples. For example, division of the units is only logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected depending on actual requirements to achieve the objectives of the solutions in the embodiments.

When the functions are implemented in a form of a software functional unit and sold or used as an independent product, the functions may be stored in a computer-readable storage medium. Based on such an understanding, the technical solutions in this application essentially, or the part contributing to the conventional technology, or some of the technical solutions may be implemented in the form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

It is clear that a person skilled in the art can make various modifications and variations to this application without departing from the spirit and scope of this application. This application is intended to cover these modifications and variations of this application provided that they fall within the scope of protection defined by the claims of this application and their equivalent technologies.

What is claimed is:

1. An uplink data sending method applied in a first terminal device, comprising:

receiving, from one or more second terminal devices, third indication information that indicates an antenna coherence capability of the one or more second terminal devices;

determining an antenna coherence capability of a virtual terminal device based on an antenna coherence capability of the first terminal device and the antenna coherence capability of the one or more second terminal devices, wherein antennas of the virtual terminal device comprise a first antenna of the first terminal device and one or more second antennas of the one or more second terminal devices;

sending first indication information to a network device, wherein the first indication information indicates the antenna coherence capability of the virtual terminal device and the first indication information is for determining a first precoding codebook subset operable by the virtual terminal device;

receiving configuration information from the network device, wherein the configuration information indicates the first precoding codebook subset; and sending data to the network device based on the first precoding codebook subset.

2. The method of claim 1, wherein each antenna coherence capability comprises fully coherent, partial coherent, or non-coherent.

3. The method of claim 1, the method further comprising:

receiving second indication information from the network device, wherein the second indication information indicates a correspondence between the first terminal device and at least one second terminal device, and the one or more second terminal devices belong to the at least one second terminal device.

4. The method of claim 1, wherein the sending the first indication information to the network device comprises:

determining that a preset condition is met, and sending the first indication information to the network device, wherein the preset condition comprises one or more of the following conditions:

the first terminal device receives second indication information indicating a correspondence between the first terminal device and at least one second terminal device, wherein the one or more second terminal devices belong to the at least one second terminal device, a data rate of uplink data is greater than or equal to a first preset threshold, or a quantity of antennas of the first terminal device is less than or equal to a second preset threshold.

5. The method of claim 1, the method further comprising:

sending the first indication information to the one or more second terminal devices.

6. An uplink data receiving method, comprising:

receiving, from a first terminal device, second indication information that indicates an antenna coherence capability of the first terminal device;

receiving, from one or more second terminal devices, third indication information that indicates an antenna coherence capability of the one or more second terminal devices;

determining an antenna coherence capability of a virtual terminal device based on the antenna coherence capability of the first terminal device and the antenna coherence capability of the one or more second terminal devices, wherein antennas of the virtual terminal device comprise a first antenna of the first terminal device and one or more second antennas of the one or more second terminal devices;

determining a first precoding codebook subset operable by the virtual terminal device based on the antenna coherence capability of the virtual terminal device;

sending first indication information to the first terminal device, wherein the first indication information indicates the first precoding codebook subset; and receiving uplink data from the first terminal device, wherein the uplink data is sent based on the first precoding codebook subset.

7. The method of claim 6, wherein the first indication information indicates a candidate set of the first precoding codebook subset.

8. A communication apparatus, comprising:

a non-transitory memory configured to store program instructions, and one or more processors configured to execute the program instructions to cause the communication apparatus to:

receive, from one or more second terminal devices, third indication information that indicates an antenna coherence capability of the one or more second terminal devices;

determine an antenna coherence capability of a virtual terminal device based on an antenna coherence capability of a first terminal device and the antenna coherence capability of the one or more second terminal devices, wherein antennas of the virtual terminal device comprise a first antenna of the first terminal device and one or more second antennas of the one or more second terminal devices;

determine first indication information for determining a first precoding codebook subset operable by the virtual terminal device;

send the first indication information to a network device;

receive configuration information from the network device, wherein the configuration information indicates the first precoding codebook subset; and send data to the network device based on the first precoding codebook subset.

9. The communication apparatus of claim 8, wherein each antenna coherence capability comprises fully coherent, partial coherent, or non-coherent.

10. The communication apparatus of claim 8, wherein the one or more processors is further configured to execute the program instructions to cause the communication apparatus to:

receive second indication information from the network device, wherein the second indication information indicates a correspondence between the first terminal device and at least one second terminal device, and the one or more second terminal devices belong to the at least one second terminal device.

11. The communication apparatus of claim 8, wherein the one or more processors is further configured to execute the program instructions to cause the communication apparatus to:

send the first indication information to the network device when determining that a preset condition is met, wherein the preset condition comprises one or more of the following conditions:

receive second indication information indicating a correspondence between the first terminal device and at least one second terminal device, wherein the one or more second terminal devices belong to the at least one second terminal device, a data rate of uplink data of the communication apparatus is greater than or equal to a first preset threshold, or a quantity of antennas of the communication apparatus is less than or equal to a second preset threshold.

12. The communication apparatus of claim 8, wherein the one or more processors is further configured to execute the program instructions to cause the communication apparatus to:

send the first indication information to the one or more second terminal devices.

13. A communication apparatus, comprising:

a non-transitory memory configured to store program instructions; and one or more processors configured to execute the program instructions to cause the communication apparatus to:

receive, from a first terminal device, second indication information that indicates an antenna coherence capability of the first terminal device;

receive, from one or more second terminal devices, third indication information that indicates an antenna coherence capability of the one or more second terminal devices;

determine an antenna coherence capability of a virtual terminal device based on the antenna coherence capability of the first terminal device and the antenna coherence capability of the one or more second terminal devices, wherein antennas of the virtual terminal device comprise a first antenna of the first terminal device and one or more second antennas of the one or more second terminal devices;

determine a first precoding codebook subset operable by the virtual terminal device;

send first indication information to the first terminal device, wherein the first indication information indicates the first precoding codebook subset; and receive uplink data from the first terminal device, wherein the uplink data is sent based on the first precoding codebook subset.

14. The communication apparatus of claim 13, wherein the first indication information indicates a candidate set of the first precoding codebook subset.

* * * * *